United States Patent
Nishimura et al.

(10) Patent No.: US 9,389,346 B2
(45) Date of Patent: Jul. 12, 2016

(54) LIGHT DIFFUSING FILM, POLARIZING PLATE WITH LIGHT DIFFUSING FILM, LIQUID CRYSTAL DISPLAY DEVICE, AND LIGHTING EQUIPMENT

(75) Inventors: Akinori Nishimura, Ibaraki (JP); Kozo Nakamura, Ibaraki (JP); Hiroyuki Takemoto, Ibaraki (JP); Takehito Fuchida, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 169 days.

(21) Appl. No.: 13/822,566

(22) PCT Filed: Sep. 16, 2011

(86) PCT No.: PCT/JP2011/071231
§ 371 (c)(1),
(2), (4) Date: Jun. 3, 2013

(87) PCT Pub. No.: WO2012/036272
PCT Pub. Date: Mar. 22, 2012

(65) Prior Publication Data
US 2013/0242241 A1 Sep. 19, 2013

(30) Foreign Application Priority Data
Sep. 17, 2010 (JP) .................. 2010-210129

(51) Int. Cl.
*G02F 1/1335* (2006.01)
*G02B 5/02* (2006.01)

(52) U.S. Cl.
CPC ............ *G02B 5/0242* (2013.01); *G02B 5/0278* (2013.01); *G02F 1/133504* (2013.01)

(58) Field of Classification Search
CPC ............ G02F 1/133504; G02B 5/0242; G02B 5/0278
USPC .......................................................... 349/64
See application file for complete search history.

(56) References Cited

U.S. PATENT DOCUMENTS 6,771,336 B2  8/2004  Tatsuta et al.
7,997,743 B2  8/2011  Suzuki et al.
(Continued)

FOREIGN PATENT DOCUMENTS

CN  101545994 A  9/2009
CN  101650447 A  2/2010
(Continued)

OTHER PUBLICATIONS

Chinese Office Action dated Aug. 1, 2014, issued in corresponding CN application No. 201180044554.6. with English translation (23 pages).
(Continued)

*Primary Examiner* — Nathanael R Briggs
(74) *Attorney, Agent, or Firm* — Westerman, Hattori, Daniels & Adrian, LLP

(57) ABSTRACT

There is provided an extremely thin light diffusing film, which has strong light diffusibility, has suppressed backscattering, and is excellent in productivity. The light diffusing film includes: a first region having a first refractive index; a substantially spherical shell-shaped refractive index modulation region surrounding the first region; and a second region having a second refractive index, the region being positioned on a side of the refractive index modulation region opposite to the first region. The light diffusing film has a light diffusion half-value angle of 30° or more and a thickness of 4 μm to 25 μm, and satisfies the following expressions (1) and (2):

$$y \leq 0.011x \, (30 \leq x \leq 60) \quad (1)$$

$$y \leq 0.0275x - 0.99 \, (60 < x) \quad (2)$$

where x represents the light diffusion half-value angle (°) and y represents a backscattering ratio (%), the expressions (1) and (2) each representing a relationship between a numerical value for the light diffusion half-value angle and a numerical value for the backscattering ratio.

33 Claims, 15 Drawing Sheets

(56) References Cited

U.S. PATENT DOCUMENTS

| | | | |
|---|---|---|---|
| 8,031,302 B2 | 10/2011 | Hou et al. | |
| 8,033,674 B1* | 10/2011 | Coleman | G02B 5/021 359/483.01 |
| 8,405,794 B2 | 3/2013 | Fuchida et al. | |
| 2002/0135714 A1 | 9/2002 | Tatsuta et al. | |
| 2007/0103786 A1* | 5/2007 | Muramatsu | G02B 1/11 359/599 |
| 2007/0134438 A1* | 6/2007 | Fabick et al. | 428/1.1 |
| 2007/0139781 A1* | 6/2007 | Inoue | G02B 5/0242 359/599 |
| 2007/0159580 A1* | 7/2007 | Yoshioka et al. | 349/117 |
| 2009/0051278 A1 | 2/2009 | Saneto et al. | |
| 2009/0244447 A1* | 10/2009 | Hou et al. | 349/96 |
| 2010/0039708 A1 | 2/2010 | Suzuki et al. | |
| 2011/0317099 A1 | 12/2011 | Fuchida et al. | |

FOREIGN PATENT DOCUMENTS

| | | | |
|---|---|---|---|
| CN | 102356334 A | 2/2012 | |
| JP | 6-347617 A | 12/1994 | |
| JP | 3071538 B2 | 7/2000 | |
| JP | 2002-212245 A | 7/2002 | |
| JP | 2002-214408 A | 7/2002 | |
| JP | 2002-328207 A | 11/2002 | |
| JP | 2003-262710 A | 9/2003 | |
| JP | 2009-70814 A | 4/2009 | |
| JP | 2009-244383 A | 10/2009 | |
| JP | 2010-077243 A | 4/2010 | |
| JP | 2010-77243 A | 4/2010 | |
| JP | 2010-107616 A | 5/2010 | |
| TW | 200707012 A | 2/2007 | |
| TW | 200730886 A | 8/2007 | |
| TW | 201011356 A | 3/2010 | |
| TW | 201038979 A | 11/2010 | |
| WO | 2006/124588 A1 | 11/2006 | |
| WO | 2010/106990 A1 | 9/2010 | |

OTHER PUBLICATIONS

International Search Report for PCT/JP2011/071231, mailing date of Nov. 8, 2011.

* cited by examiner

LIGHT DIFFUSING FILM, POLARIZING PLATE WITH LIGHT DIFFUSING FILM, LIQUID CRYSTAL DISPLAY DEVICE, AND LIGHTING EQUIPMENT

TECHNICAL FIELD

The present invention relates to a light diffusing film, a polarizing plate with a light diffusing film, a liquid crystal display device, and a lighting equipment.

BACKGROUND ART

A light diffusing element is typically a sheet-shaped optical element including a resin matrix and fine particles dispersed in the matrix, and expresses light diffusibility on the basis of a difference in refractive index between each of the fine particles and the matrix (see, for example, Patent Literature 1). The light diffusing element has been widely utilized in, for example, a lighting cover, a screen for a projection television, or a surface-emitting device (e.g., a liquid crystal display device). In any one of the applications of the light diffusing element, such characteristics as the realization of high image quality or high lighting quality, an improvement in efficiency for light utilization, and industrially excellent production efficiency have been required. The light diffusing element needs to have sufficient light diffusibility to realize high image quality or high lighting quality. However, when the difference in refractive index between each of the fine particles and the matrix is enlarged for improving the light diffusibility, backscattering enlarges. Therefore, it is difficult for the conventional light diffusing element obtained by simply dispersing the fine particles in the matrix to realize high image quality or high lighting quality. Further, the enlargement of the backscattering in the conventional light diffusing element is incompatible with a recent worldwide trend toward the reduction of an environmental load because such enlargement reduces the efficiency for light utilization. Various technologies (e.g., a light diffusing element obtained by dispersing so-called gradient index (GRIN) fine particles in which a refractive index continuously changes from the center portion, of a fine particle toward its outside) have heretofore been proposed for improving the characteristics of the light diffusing element (see, for example, Patent Literatures 2 to 8). However, none of the technologies has provided a light diffusing element satisfying both sufficient light diffusibility and low backscattering.

As described above, realization of both sufficient light diffusibility and low backscattering is a problem that has long been unsolved in the light diffusing element, and the establishment of a technology by which a light diffusing element satisfying both the two characteristics is obtained with industrially excellent production efficiency has been strongly demanded.

CITATION LIST

Patent Literature

[PTL 1] JP 3071538 B2
[PTL 2] JP 06-347617 A
[PTL 3] JP 2003-262710 A
[PTL 4] JP 2002-212245 A
[PTL 5] JP 2002-214408 A
[PTL 6] JP 2002-328207 A
[PTL 7] JP 2010-077243 A
[PTL 8] JP 2010-107616 A

SUMMARY OF INVENTION

Technical Problem

The present invention has been made in view of solving the above-described problems, and an object of the present invention is to provide an extremely thin light diffusing film, which has strong light diffusibility, has suppressed backscattering, and is excellent in productivity.

Solution to Problem

A light diffusing film according to an embodiment of the present invention includes: a first region having a first refractive index; a substantially spherical shell-shaped refractive index modulation region surrounding the first region; and a second region having a second, refractive index, the region being positioned on a side of the refractive index modulation region opposite to the first region. The light diffusing film has a light diffusion half-value angle of 30° or more and a thickness of 4 μm to 25 μm, and satisfies the following expressions (1) and (2):

$$y \leq 0.011x (30 \leq x \leq 60) \quad (1)$$

$$y \leq 0.0275x - 0.99 (60 < x) \quad (2)$$

where x represents the light diffusion half-value angle (°) and y represents a backscattering ratio (%), the expressions (1) and (2) each representing a relationship between a numerical valve for the light diffusion half-value angle and a numerical value for the backscattering ratio.

In one embodiment of the present invention, the refractive index modulation region is formed of a fine uneven-shaped and spherical shell-shaped boundary formed by the first region and the second region.

A light diffusing film according to an embodiment of the present invention includes: a matrix; and light diffusing fine particles dispersed in the matrix. The light diffusing film has a light diffusion half-value angle of 30° or more and a thickness of 4 μm to 25 μm, and satisfies the following expressions (1) and (2):

$$y \leq 0.011x (30 \leq x \leq 60) \quad (1)$$

$$y \leq 0.0275x - 0.99 (60 < x) \quad (2)$$

where x represents the light diffusion half-value angle (°) and y represents a backscattering ratio (%), the expressions (1) and (2) each representing a relationship between a numerical value for the light diffusion half-value angle and a numerical value for the backscattering ratio.

In one embodiment of the present invention, a standard deviation a of in-plane brightnesses is 0.8 or less.

In one embodiment of the present invention, a refractive index modulation region in which a refractive index changes in a substantially continuous manner is formed at an interface between the matrix and each of the light diffusing fine particles or in a vicinity thereof.

In one embodiment of the present invention, the matrix contains a resin component and an ultrafine particle component, and the refractive index modulation region is formed by a substantial gradient of a dispersion concentration of the ultrafine particle component in the matrix.

According to another aspect of the present invention, a polarizing plate with a light diffusing film is provided. The polarizing plate with a light diffusing film includes: the above-mentioned light diffusing film; and a polarizer.

According to still another aspect of the present invention, a liquid crystal display device is provided. The liquid crystal display device includes: a liquid crystal cell; and the above-mentioned light diffusing film.

According to still another aspect of the present invention, a lighting equipment is provided. The lighting equipment includes: a light source; and the above-mentioned light diffusing film.

Advantageous Effects of Invention

According to the present invention, an extremely thin light diffusing film which has strong light diffusibility and in which backscattering is suppressed can be realized. Specifically, the following light diffusing film can be realized. The film has a light diffusion half-value angle of 30° or more, its light diffusion half-value angle and backscattering ratio have a specific relationship, and its thickness is 4 µm to 25 µm. Although a strongly diffusible and low-backscattering light diffusing element has heretofore been demanded, a light diffusing element sufficiently satisfying such characteristics has not been realized. As described above, the present invention can provide a strongly diffusible and low-backscattering light diffusing element simply and with industrially excellent production efficiency, and in an extremely thin film shape, and hence solves the problem that has long been unsolved in the art.

DESCRIPTION OF EMBODIMENTS

Figure 1A:
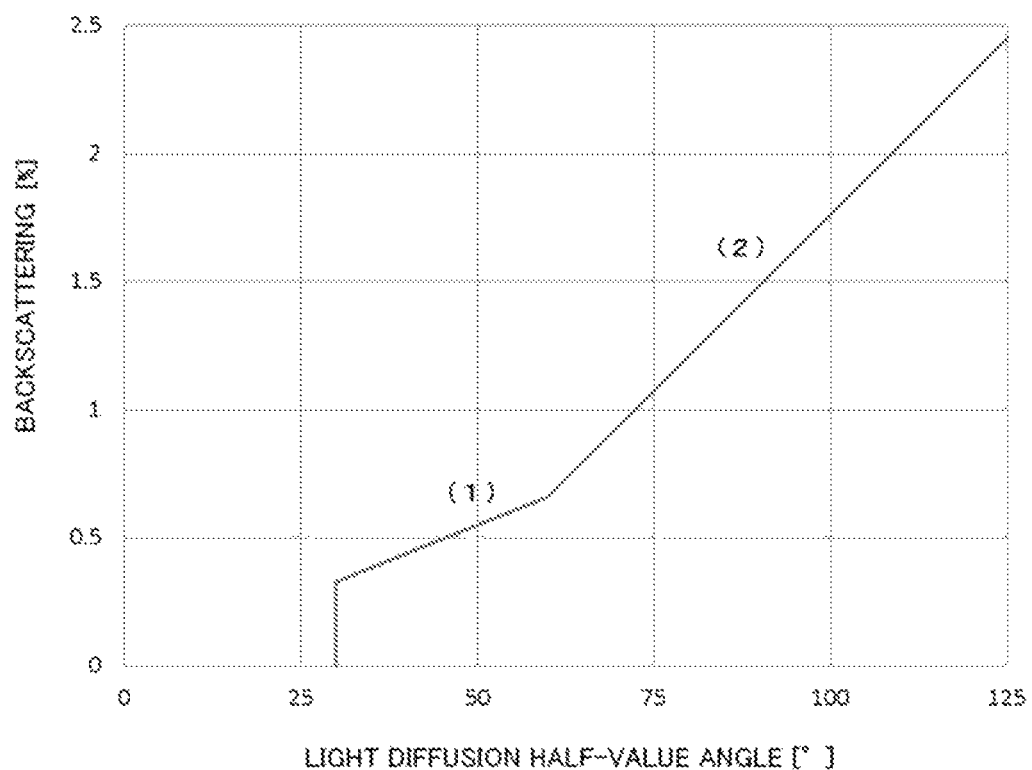
FIG. 1A is a graph illustrating a relationship between a light diffusion half-value angle and backscattering ratio in a light diffusing film according to a preferred embodiment of the present invention.

Hereinafter, preferred embodiments of the present invention are described with reference to the drawings. However, the present invention is not limited to these specific embodiments.

A. Light Diffusing Film

A-1. Entire Construction

A light cliff using film according to an embodiment of the present invention has a first region having a first refractive index and a second region having a second refractive index. The light diffusing film of the present embodiment expresses a light diffusing function on the basis of a difference in refractive index between the first region and the second region. In the present invention, the first region is surrounded by a substantially spherical shell-shaped refractive index modulation region, and the second region is formed so as to be positioned on the side of the refractive index modulation region opposite to the first region. Therefore, in the light diffusing film of the present embodiment, the first region surrounded by the refractive index modulation region is seemingly in a state of being dispersed in the second region. In the refractive index modulation region, a refractive index changes in a substantially continuous manner. The phrase "refractive index changes in a substantially continuous manner" as used herein means that the refractive index has only to change in a substantially continuous manner in the refractive index modulation region. Therefore, even when a refractive index gap within a predetermined range (e.g., a refractive index difference of 0.05 or less) is present at, for example, an interface between the first region and the refractive index modulation region and/or an interface between the refractive index modulation region and the second region, the gap is acceptable.

The light diffusing film of the present embodiment has a light diffusion half-value angle of 30° or more and a thickness of 4 µm to 25 µm, and satisfies the following expressions (1) and (2):

$$y \leq 0.011x \quad (30 \leq x \leq 60) \quad (1)$$

$$y \leq 0.0275x - 0.99 \quad (60 < x) \quad (2)$$

where x represents the light diffusion half-value angle (°) and y represents a backscattering ratio (%), the expressions (1) and (2) each representing a relationship between a numerical value for the light diffusion half-value angle and a numerical value for the backscattering ratio. That is, in the present invention, the light diffusion half-value angle and the backscattering ratio satisfy such a relationship as to enter a region below straight lines (1) and (2) in FIG. 1A. One of the results of the present invention is that such a strongly diffusible, low-backscattering, and extremely thin light diffusing film was actually obtained. The relationship between the light diffusion half-value angle x and the backscattering ratio y preferably satisfies the following expressions (1a) and (2a). The expressions (1), (1a), (2), and (2a) each specify a preferred upper limit for the backscattering ratio y with respect to the light diffusion half-value angle x.

$$y \leq 0.011x - 0.11 \quad (30 \leq x \leq 60) \quad (1a)$$

$$y \leq 0.0275x - 1.10 \quad (60 < x) \quad (2a)$$

Meanwhile, a preferred lower limit, for the backscattering ratio y with respect to the light diffusion half-value angle x is specified by each of the following expressions (1b) and (2b), and a snore preferred lower limit for the ratio is specified by each of the following expressions (1c) and (2c).

$$y \geq 0.011x - 0.56 \quad (30 \leq x \leq 60) \quad (1b)$$

$$y \geq 0.0275x - 1.55 \quad (60 < x) \quad (2b)$$

$$y \geq 0.011x - 0.46 \quad (30 \leq x \leq 60) \quad (1c)$$

$$y \geq 0.0275x - 1.45 \quad (60 < x) \quad (2c)$$

Further, as described above, the light diffusion half-value angle is 30° or more, preferably 30° to 130° (15° to 65° on one side). The light diffusion half-value angle is more preferably 40° to 90° (20° to 45° on one side) from the viewpoint of using the film as a member for a display device. The effects of the reduction of the backscattering ratio and the uniformity (described later) of an in-plane brightness can be expressed only when the light diffusion half-value angle becomes 30° or more. For example, when the light diffusion half-value angle is about 5°, the backscattering ratio may be extremely small but light diffusibility is extremely insufficient in many cases. The backscattering ratio can adopt any appropriate value capable of satisfying the expressions (1) and (2). The backscattering ratio is preferably 0.70% or less, more preferably 0.50% or less, still more preferably 0.30% or less. The lower limit for the backscattering ratio is, for example, 0.02%. Further, another result of the present invention is that characteristics that could, not have been made compatible so far, i.e., strong diffusibility and low backscattering were able to be optimized with the realizable relationship by the expressions (1) and (2). For example, when a light diffusing film has a light diffusion half-value angle of 35° and a backscattering ratio of 0.48%, the light diffusing element can be formally referred to as being "strongly diffusible and low-backscattering," such light diffusion half-value single and backscattering ratio deviate from the region of FIG. 1A. The use of a light diffusing element having such characteristics in, for example, a liquid crystal display device may cause the white blurring of black display at a bright place. In other words, according to the present embodiment, a light diffusing film that is not only strongly diffusible and low-backscattering in literal and numerical senses but also can show extremely excellent display characteristics at the time of its mounting can be obtained by optimizing the light diffusion half-value angle and the backscattering ratio with such relationship as illustrated in FIG. 1A.

The light diffusing film sufficiently exerts its effect when its haze is high. The base of the light diffusing film is preferably 90% to 99.9%, more preferably 92% to 99.9%, still more preferably 95% to 99.9%, particularly preferably 97% to 99.9%. According to the present invention, a light diffusing film having a high haze value in addition to the light diffusion half-value angle irrespective of its extremely thin thickness can be obtained. It should be noted that the haze represents the intensity of the diffusion of light, i.e., the extent to which incident light is diffused, and on the other hand, the light diffusion half-value angle represents the quality of diffused light, i.e., the angle range of light to be diffused.

The thickness of the light diffusing film is preferably 4 µm to 20 µm, more preferably 4 µm to 15 µm, still more preferably 4 µm to 11 µm. As described above, according to the present embodiment, a light diffusing film having extremely high diffusibility (e.g., a large light diffusion half-value angle) irrespective of such extremely thin thickness can be obtained. When the film has such thin thickness, the film does not break when bent and hence can be stored in a roll shape. In addition, as described later, the light diffusing film of the present invention can be formed by application, and hence, for example, the production of the light diffusing film and its attachment to a polarizing plate can be continuously performed by a so-called roll-to-roll process. Therefore, the light diffusing film of the present embodiment is markedly excellent in productivity of the light diffusing film itself as compared with a conventional light diffusing element, and has extremely high production efficiency of attachment to any other optical member such as a polarizing plate. It should be noted that the term "roll-to-roll process" refers to a method involving continuously attaching long films with their longitudinal directions aligned while conveying the films with a roil.

The standard deviation σ of the in-plane brightnesses of the light diffusing film, is preferably 0.8 or less, more preferably 0.7 or less, still more preferably 0.6 or less, particularly preferably 0.1 to 0.5. The standard deviation of the in-plane brightnesses serves as an indicator of external appearance unevenness. According to the present embodiment, a light diffusing film showing small external appearance unevenness irrespective of being extremely thin can be obtained. The standard deviation of the in-plane brightnesses can be obtained by, for example, forming a laminate of a light diffusing film laminate (base material film+flight diffusing film) and two polarizing plates placed in a crossed Nichol state so that the light diffusing film laminate may be sandwiched therebetween, measuring a brightness upon transmission of white light from one surface of the laminate, and converting the brightness into a numeral through any appropriate image processing.

The first region, the second region, and the refractive index modulation region can be formed by any suitable means. Examples thereof include the following means: (1) dispersing, in a resin, refractive index gradient fine particles such as so-called GRIN fine particles the refractive index of which changes continuously from the center portion of the fine particles to an outer side, and using a refractive index gradient portion, as a refractive index modulation region; (2) forming a refractive index modulation region at an interface between a matrix and each of light diffusion fine particles or in the vicinity thereof by a substantial gradient of dispersion concentration of an ultrafine particle component through use of a resin component and the ultrafine particle component in the matrix; and (3) forming a fine uneven-shaped and spherical shell-shaped boundary with the first region and the second region and forming a refractive index modulation region with the boundary. Hereinafter, an embodiment in which a resin component and an ultrafine particle component are used in a matrix is mainly described for a specific construction of a light diffusing film capable of realizing such characteristics as described above, and only a characteristic portion of an embodiment in which a refractive index gradient fine particle is used is briefly described. An embodiment in which a fine uneven-shaped and spherical shell-shaped boundary is formed is described as an example of the embodiment in which the resin component and the ultrafine particle component are used in the matrix.

Figure 1B:
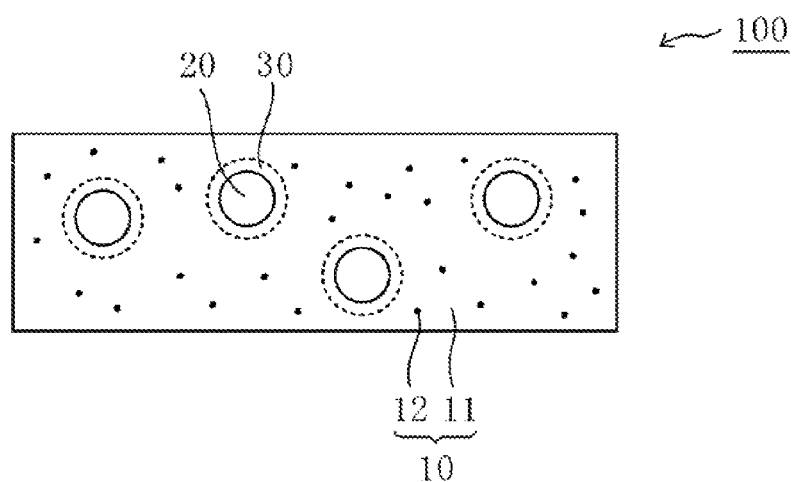
FIG. 1B is a schematic cross-sectional view of a light diffusing film according to a preferred embodiment of the present invention.
Figure 1C:
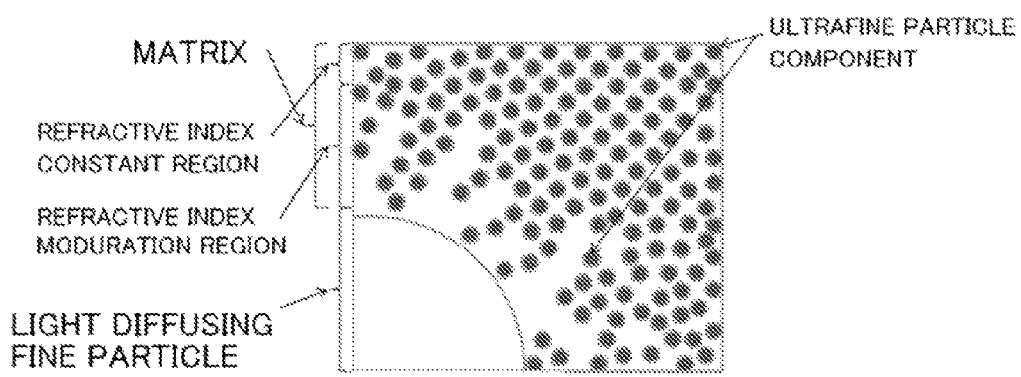
FIG. 1C is an enlarged schematic view illustrating the vicinity of a light diffusing fine particle of the light diffusing film of FIG. 1B.
Figure 2A:
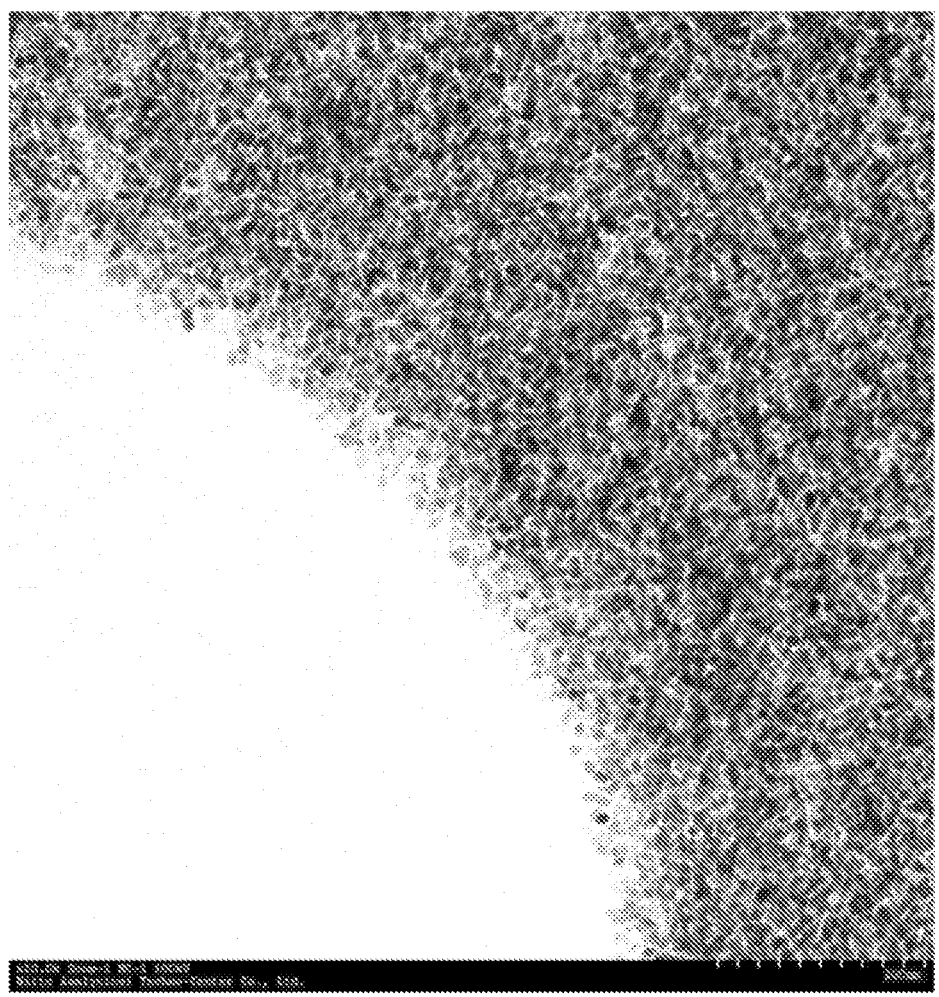
FIG. 2A is a TEM image for illustrating the dispersed state of an ultrafine particle component in the vicinity of a light diffusing fine particle in a light diffusing film according to a preferred embodiment of the present invention.
Figure 2B:
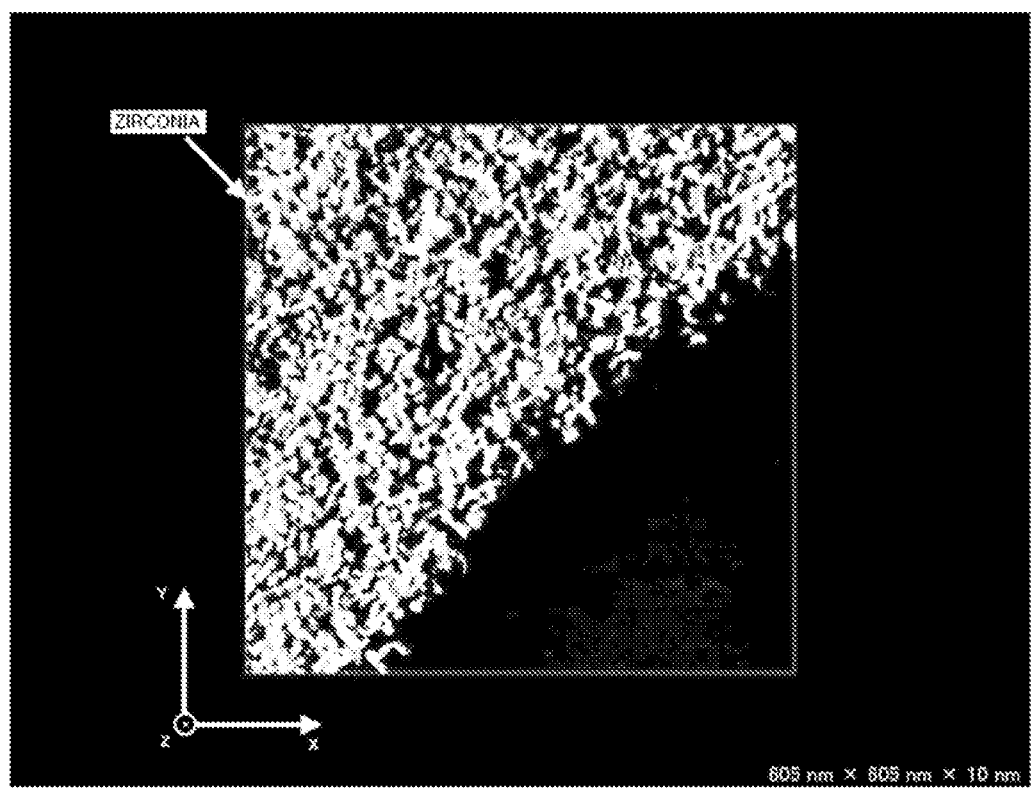
FIG. 2B is a three-dimensional image reconstructed from the TEM image of FIG. 2A viewed from one direction.
Figure 2C:
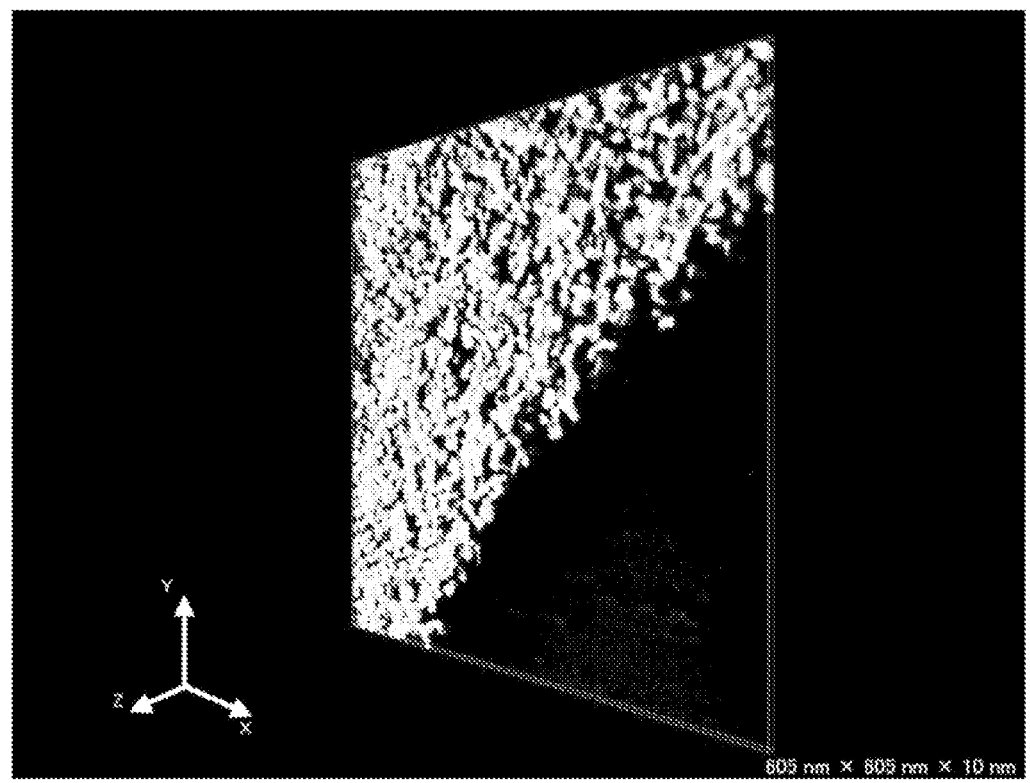
FIG. 2C is a three-dimensional image reconstructed from the TEM image of FIG. 2A viewed from another direction.
Figure 2D:
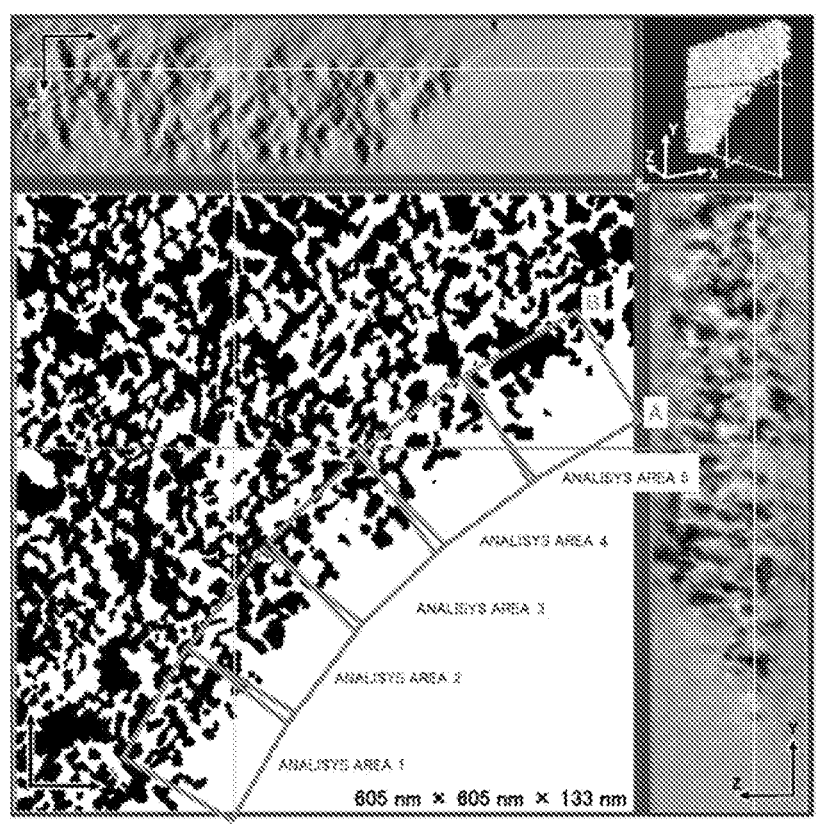
FIG. 2D is a binarized image of the three-dimensional reconstructed image of FIG. 2B, the figure being used for illustrating a method of calculating the dispersion concentration (presence ratio) of the ultrafine particle component in the vicinity of an interface between a matrix and the light diffusing fine particle.
Figure 3:
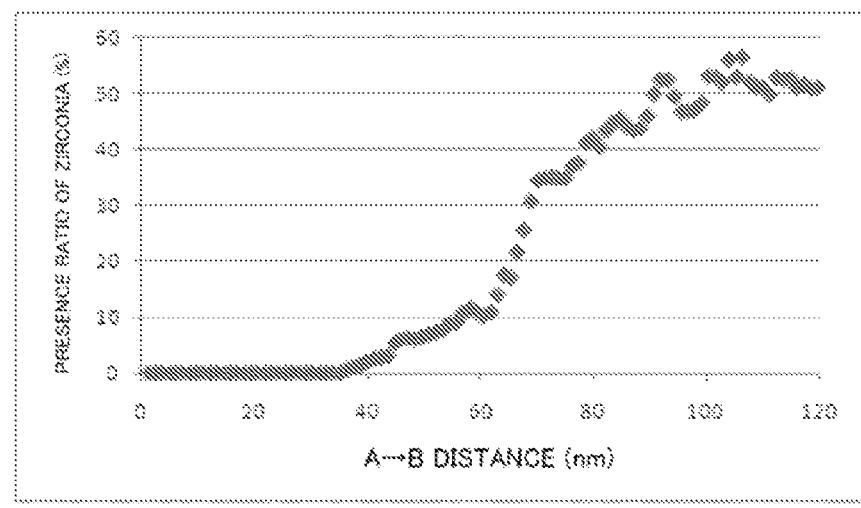
FIG. 3 is a graph illustrating a relationship between a distance from the surface of the light diffusing fine particle and the dispersion concentration (presence ratio) of the ultrafine particle component in a light diffusing film according to a preferred embodiment of the present invention.

In one embodiment, the light diffusing film of the present invention has a matrix and light diffusing fine particles dispersed in the matrix, and expresses a light diffusing function on the basis of a difference in refractive index between the matrix and each of the light diffusing fine particles. In this embodiment, the light diffusing fine particles correspond to the first region, and the matrix corresponds to the second region. FIG. 1B is a schematic cross-sectional view of the light diffusing film according to this embodiment. As illustrated in FIG. 1B, a refractive index modulation region 30 is preferably formed in the vicinity of an interface between a matrix 10 and each of the light diffusing fine particles 20. Therefore, the matrix has the refractive index modulation region in the vicinity of the interface with each of the light diffusing fine particles and a refractive index constant region on the outside of the refractive index modulation region (side distant from the light diffusing fine particle). It is preferred that the portion except the refractive index modulation region in the matrix be substantially the refractive index constant region. The matrix preferably contains a resin component and an ultrafine particle component. A light diffusing film 100 of FIG. 1B has the matrix 10 containing a resin component 11 and an ultrafine particle component 12, and the light diffusing fine particles 20 dispersed in the matrix 10. The refractive index modulation region 30 is preferably formed by a substantial gradient of the dispersion concentration of the ultrafine particle component 12 in the matrix 10. Specifically, as illustrated in FIG. 1C, in the refractive index modulation region 30, the dispersion concentration of the ultrafine particle component 12 (typically specified by a weight concentration) increases as a distance from the light diffusing fine particle 20 lengthens (the weight concentration of the resin component 11 inevitably reduces). In other words, the ultrafine particle component 12 is dispersed at a relatively low concentration in the region close to the light diffusing fine particle 20 in the refractive index modulation region 30, and the concentration of the ultrafine particle component 12 increases as the distance from the light diffusing fine particle 20 lengthens. Such gradient of the dispersion concentration is described with reference to a transmission electron microscope (TEM) image. FIG. 2A is a two-dimensional TEM image showing the dispersed state of the ultrafine particle component in the vicinity of the light diffusing fine particle, FIG. 2B and FIG. 2C are three-dimensional images reconstructed from the TEM image of FIG. 2A viewed from directions different from each other, and FIG. 2D is a binarized image of the three-dimensional reconstructed image of FIG. 2B. FIG. 3 is a graph illustrating a relationship between a distance from the surface of the light diffusing fine particle and the dispersion concentration (presence ratio) of the ultrafine particle component calculated from the TEM images of FIG. 2A to FIG. 2C. The graph of FIG. 3 is obtained by: dividing a portion in the vicinity of the interface between the matrix and the light diffusing fine particle of FIG. 2D into five analysis areas; subjecting each of the five analysis areas to image processing; calculating a relationship between the distance from the surface of the light diffusing fine particle and the dispersion concentration (presence ratio) of the ultrafine particle component in each analysis area; averaging the calculated results; and graphing the average. As shown in FIG. 2A to FIG. 2C, in the refractive index modulation region, the dispersion concentration of the ultrafine particle component 12 (typically specified by a weight concentration) becomes relatively low as a distance from the refractive index constant region of the matrix 10 lengthens, and the extents to which the respective ultrafine particles approach the light diffusing fine particle differ from each, other. It is preferred that as illustrated in FIG. 3, the gradient of the concentration change of the dispersion concentration of the ultrafine particle component be small on a side close to the light diffusing fine particle 20 and be large on a side close to the refractive index constant region, and the concentration change while forming a substantial gradient from the side of the light diffusing fine particle to the side of the refractive index constant region. In other words, the gradient of the concentration change of the dispersion concentration, of the ultrafine particle component 12 enlarges as the distance from the light diffusing fine particle lengthens. According to this embodiment, the refractive index modulation region 30 can be formed in the vicinity of an interface between the matrix 10 and each of the light diffusing fine particles 20 through use of a substantial gradient of dispersion concentration of the ultrafine particle component 12, and hence, the light diffusing film can be produced by a simple procedure at low cost. Further, by forming the refractive index modulation region through use of a substantial gradient of dispersion concentration of the ultrafine particle component, the refractive index is allowed to change smoothly in a boundary between the refractive index modulation region 30 and the refractive index constant region. Further, the refractive index difference between the light diffusing fine particle and the matrix (substantially, the refractive index constant region) can be increased, and the refractive index gradient of the refractive index modulation region can be made steep through use of the ultrafine particle component the refractive index of which is largely different from those of the resin component and the light diffusing fine particle. As a result, an extremely thin light diffusing film which has strong light diffusibility and in which backscattering is suppressed can be obtained.

The refractive index modulation region (substantially, the substantial gradient of dispersion concentration of the ultrafine particle component as described above) can be formed by appropriately selecting materials for forming the resin component and the ultrafine particle component of the matrix, and the light diffusing fine particles, and chemical and thermodynamic properties. For example, by forming the resin component and the light diffusing fine particles through use of materials of the same type (for example, organic compounds), and forming the ultrafine particle component through use a material (for example, an inorganic compound) of a different type from those of the resin component and the light diffusing fine particles, the refractive index modulation region can be formed satisfactorily. Further, for example, it is preferred that the resin component and the light diffusing fine particles be formed of materials having high compatibility with each other among the materials of the same type. The thickness and refractive index gradient of the refractive index modulation region can be controlled by adjusting the chemical and thermodynamic properties of the resin component and the ultrafine particle component of the matrix, and the light diffusing fine particles. It should be noted that the term "same type" as used herein means that chemical structures and properties are equivalent or similar, and the term "different type" refers to a type ether than the same type. Whether or not materials are of the same type varies depending upon the way of selecting a standard. For example, based on whether materials are organic or inorganic, organic compounds are compounds of the same type, and an organic compound and an inorganic compound are compounds of different types. Based on a repeating unit of a polymer, for example, an acrylic polymer and an epoxy-based polymer are compounds of different types in spite of the fact that they are both organic compounds. Based on the periodic table, an alkaline metal and a transition metal are elements of different types in spite of the fact that they are both inorganic elements.

More specifically, the substantial gradient of dispersion concentration of the ultrafine particle component as described above can be realized by the following method (1) or (2), or an appropriate combination thereof: (1) The dispersion concentration of the ultrafine particle component in the matrix is adjusted. For example, by increasing the dispersion concentration of the ultrafine particle component, electrical repulsion between the ultrafine particle component becomes large. As a result, the ultrafine particle component ends up being present even in the vicinity of each of the light diffusing fine particles, and a steep refractive index gradient can be formed in the refractive index modulation region (thickness of the refractive index modulation region becomes small). (2) The cross-linking degree of the light diffusing fine particles is adjusted. For example, in light diffusing fine particles with a low cross-linking degree, a degree of freedom of constituent polymer molecules on the surfaces of the fine particles becomes high, and hence, the ultrafine particle component cannot approach the light diffusing fine particles easily. As a result, a gentle refractive index gradient can be formed in the refractive index modulation region (thickness of the refractive index modulation region becomes large). Preferably, by appropriately combining the methods (1) and (2), the substantial gradient of dispersion concentration of the ultrafine particle component as described can be realized. For example, by using an ultrafine particle component of zirconia and light diffusing fine particles of PMMA, setting the dispersion concentration of the ultrafine particle component to 30 parts by weight to 70 parts by weight with respect to 100 parts by weight of the matrix, and using light diffusing fine particles with a swelling degree of 100% to 200% with respect to a resin component precursor described later, there can be realized a dispersion concentration gradient in which the dispersion concentration of the ultrafine particle component 12 in the matrix 10 is small on a side close to the light diffusing fine particles 20 and large on a side close to the refractive index constant region, and changes while forming a substantial gradient from the light diffusing fine particle side to the refractive index constant region side. Further, there can be formed a refractive index modulation region (for example, as in an outer shape of confetti) in which the thickness varies depending upon the position of the surface of the light, diffusing fine particle. Herein, the term "swelling degree" refers to a ratio of an average particle diameter of each of the particles in a swollen state with respect to the average particle diameter of each of the particles before being swollen.

An average thickness L of the refractive index modulation region 30 is preferably 10 nm to 500 nm, more preferably 12 nm to 400 nm, still more preferably 15 nm to 300 nm. According to this embodiment, although the refractive index modulation region has an extremely small thickness, the difference in refractive index between the light diffusing fine particle and the matrix can be enlarged (a refractive index gradient can be steepened), and the refractive index can be continuously changed in the refractive index modulation region. The thickness of the refractive index modulation region 30 may be constant (that is, the refractive index modulation region may spread to the circumference of the light diffusing fine particle in a concentric sphere shape), or the thickness may vary depending upon the position of the surface of the light diffusing fine particle (for example, the refractive index modulation region may have a contour shape of a candy called confetti). Preferably, the thickness of the refractive index modulation region 30 varies depending upon the position of the surface of the light diffusing fine particle. With such construction, the refractive index can be changed more continuously in the refractive index modulation region 30. The average thickness L is an average thickness in the case where the thickness of the refractive index modulation region 30 varies depending upon the position of the surface of the light diffusing fine particle, and in the case where the thickness is constant, the constant thickness is the average thickness L.

Figure 4:
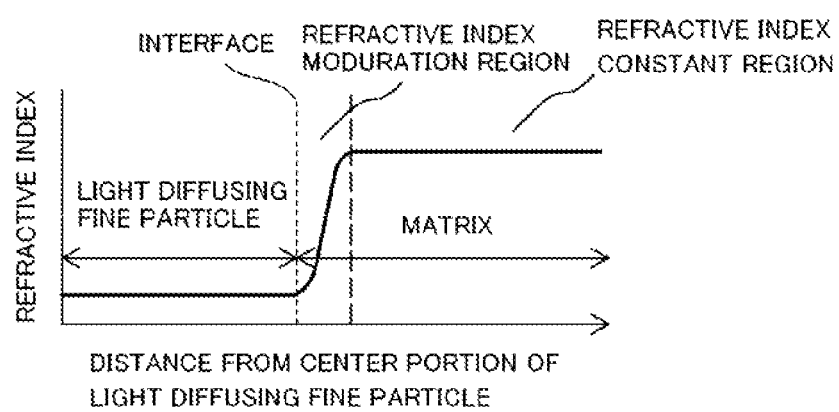
FIG. 4 is a schematic view for illustrating a change in refractive index from the center portion of the light diffusing fine particle to the matrix in the light diffusing film of the present invention.

Preferably, in the refractive index modulation region 30, the refractive index changes substantially continuously. More preferably, in addition to this, a refractive index in an outermost portion of the refractive index modulation region and a refractive index of the refractive index constant region are substantially identical. In other words, in the light diffusing film according to this embodiment, the refractive index changes continuously from the refractive index modulation region to the refractive index constant region, and preferably, the refractive index changes continuously from the light diffusing fine particle to the refractive index constant region (FIG. 4). Preferably, the change in refractive index is smooth as illustrated in FIG. 4. That is, the refractive index changes in such a shape that a tangent can be drawn on a refractive index change curve in a boundary between the refractive index modulation region and the refractive index constant region. Preferably, in the refractive index modulation region, the gradient of the change in refractive index increases with increasing distance from the light diffusing fine particle. According to this embodiment, as described later, by appropriately selecting the light diffusing fine particles, and the resin component and the ultrafine particle component of the matrix, a substantially continuous change in refractive index can be realized. One of the features of the present invention lies in that the change in refractive index, which is steep as described above and which is substantially continuous, is realized. As a result, even when a refractive index difference between the matrix 10 (substantially, the refractive index constant region) and the light diffusing fine particles 20 is increased, reflection at an interface between the matrix 10 and each of the light diffusing fine particles 20 can be suppressed, and backscattering can be suppressed. Further, in the refractive index constant region, the weight concentration of the ultrafine particle component 12 the refractive index of which is largely different from that of each of the light diffusing fine particles 20 is relatively high, and hence, the refractive index difference between the matrix 10 (substantially, the refractive index constant region) and each of the light diffusing fine particles 20 can be increased. As a result, even a thin film can realize a high haze (strong diffusibility). Thus, according to the light diffusing film according to this embodiment, the refractive index difference can be increased to realize a high haze and backscattering can be suppressed remarkably. On the other hand, according to the conventional light diffusing element having formed therein no refractive index modulation region, when an attempt is made to impart strong diffusibility (for example, large light diffusion half-value, angle) by increasing a refractive index difference, the gap between refractive indices at an interface cannot be eliminated. Consequently, backscattering caused by reflection at an interface between a light diffusing fine particle and a matrix increases in many cases. According to an embodiment of the present invention, by forming the refractive index modulation region, the above-mentioned problems in the related art can be solved, and an extremely thin light diffusing film, which has a high haze value and strong diffusibility and in which backscattering is suppressed, can be obtained.

Figure 2E:
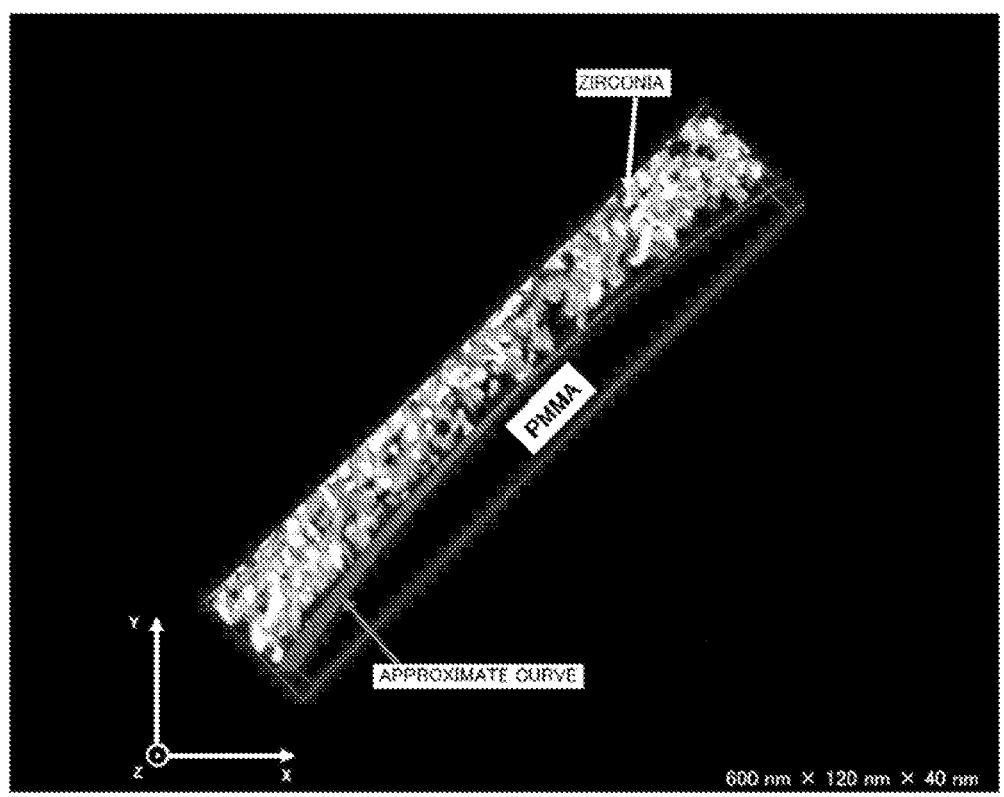
FIG. 2E is a three-dimensional reconstructed image for illustrating a method of determining the average pitch of the unevenness era fine uneven-shaped boundary and the average height of the unevenness from the three-dimensional reconstructed images of FIG. 2B and FIG. 2C.
Figure 5A:
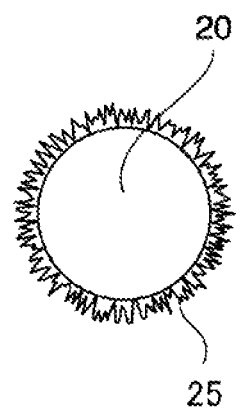
FIG. 5A is a schematic view for illustrating a fine uneven-shaped, boundary formed in the vicinity of the surface of the light diffusing fine particle, the boundary forming a refractive index modulation region.
Figure 5B:
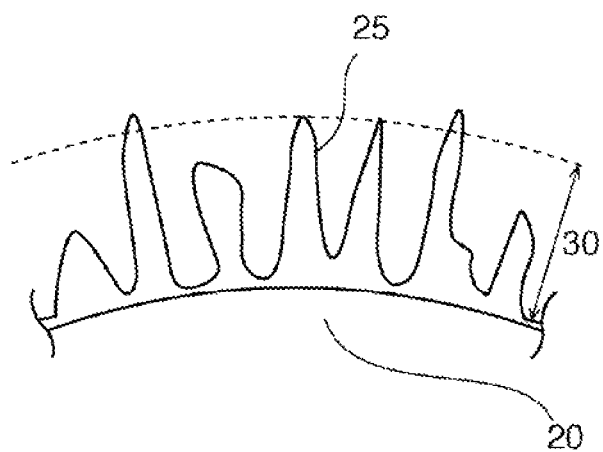
FIG. 5B is a schematic view for illustrating details about the fine uneven-shaped boundary of FIG. 5A.

In one embodiment, a region in which the ultrafine particle component 12 is dispersed, and a region in which the ultrafine particle component is not dispersed, in the matrix 10 form a fine uneven-shaped boundary in the vicinity of the interface between the matrix 10 and each of the light diffusing fine particles 20, thereby forming the substantial gradient of the dispersion concentration of the ultrafine particle component in the vicinity of the interface between the matrix and each of the light diffusing fine particles. The fine uneven-shaped boundary forms the refractive index modulation region. It should be noted that in this embodiment as well, as described above, the light diffusing fine particle corresponds to the first region and the matrix corresponds to the second region. Further, the fine uneven-shaped boundary is of a substantially spherical shell shape because the boundary is formed at the interface between the matrix and each of the light diffusing fine particles or in the vicinity thereof. FIG. 5A and FIG. 5B each illustrate a schematic view for illustrating the fine uneven-shaped boundary. As illustrated in FIG. 5A and FIG. 5B, the fine uneven-shaped boundary is preferably such that the pitches of its unevenness, the depths of its recessed portions or the heights of its protruded portions, and the shapes of the recessed portions and the protruded portions are nonuniform. The formation of such fine uneven-shaped boundary 25 in the vicinity of the interface between the matrix and each of the light diffusing fine particles can result in favorable formation of the refractive index modulation region 30. The average height of the unevenness of the fine uneven-shaped boundary is preferably 10 nm to 500 nm, more preferably 10 nm to 60 nm. The average pitch of the unevenness of the fine uneven-shaped boundary is preferably 100 nm or less, more preferably 50 nm or less, still more preferably 30 nm or less. A lower limit for the average pitch is preferably 5 nm, more preferably 10 nm. Such average pitch and average height enable the refractive index to change continuously over the entirety of the refractive index modulation region. As a result, an extremely thin light diffusing film which has strong light diffusibility and in which backscattering is suppressed can be obtained. Here, the term "average pitch" refers to the statistical average of horizontal distances between the apex and apex of protruded portions adjacent to each other in a predetermined range, and the term "average height" refers to the statistical average of the heights (vertical distances from bottoms to apexes) of the protruded portions in the predetermined range. The average pitch and the average height of the unevenness can be calculated as described below, as shown in FIG. 2E, the interface (actual interface) between the light diffusing fine particle and the matrix is sampled from such three-dimensional reconstructed images as shown in FIG. 2B and FIG. 2C, the actual interface is subjected to fitting with an approximate curve, and the average pitch and the average height are calculated from a distance between protruded portions each protruding from the approximate curve by 30 nm or more at the actual interface and the average height of the protruded portions. Such fine uneven-shaped boundary as described above has, for example, a group of conical and/or needle-shaped fine protrusions protruding from the light, diffusing fine particle toward the matrix as illustrated in FIG. 5B (it should be noted that when viewed from the matrix side, the fine uneven-shaped boundary similarly has a group of conical and/or needle-shaped fine protrusions protruding toward the light diffusing fine particle). The formation of such fine uneven-shaped boundary can provide a light diffusing film having a low reflectance. Although the refractive index modulating function of the refractive index modulation region can be expressed by virtue of the shape of the entirety of the fine uneven-shaped boundary, the dispersion concentration of the ultrafine particle component can form a substantial gradient in each protrusion of the group of protrusions at the boundary as well when viewed in an additionally microscopic manner.

Figure 6:
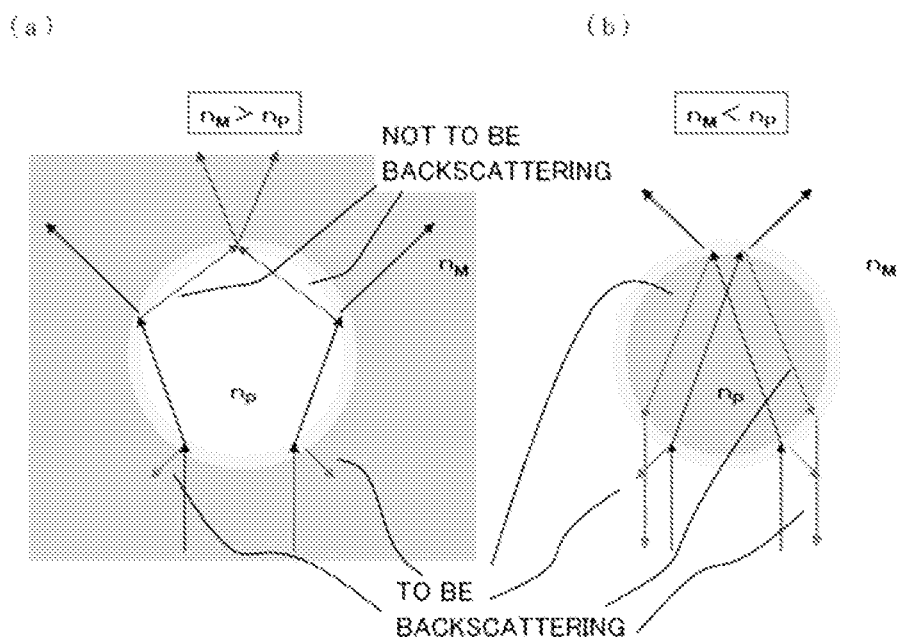
FIG. 6(a) is a conceptual diagram for illustrating a mechanism for the occurrence of backscattering in the case where the relationship of "average refractive index $n_M$ of matrix>refractive index $n_P$ of light diffusing fine particle" is satisfied.
FIG. 6(b) is a conceptual diagram for illustrating a mechanism for the occurrence of backscattering in the case where $n_M<n_P$.

In the light diffusing film according to this embodiment, it is preferred that the average refractive index $n_M$ of the matrix be larger than the refractive index $n_P$ of the light diffusing fine particle ($n_M > n_P$). As illustrated in FIG. 6(a) and FIG. 6(b) for comparison, in the case where $n_M > n_P$, as compared to the case where $n_M < n_P$, backscattering can be suppressed more satisfactorily even when the refractive index gradient of the refractive index modulation region is steep. $\Delta n$ ($=n_M - n_P$) is preferably 0.08 or more, more preferably 0.10 or more. The upper limit of $\Delta n$ is preferably 0.2.

The light diffusing film may be provided alone, or may be provided as a composite member by being attached to any appropriate base material or polarizing plate. In addition, an anti-reflection layer may be laminated on the light diffusing film.

A-2. Matrix

As described above, the matrix 10 preferably includes the resin component 11 and the ultrafine particle component 12. As described above and as illustrated in FIGS. 1A and 1B, the ultrafine particle component 12 is dispersed in the resin component 11 so as to form the refractive index modulation region 30 in the vicinity of the interface between the matrix 10 and the light diffusing fine particle 20.

A-2-1. Resin Component

The resin component 11 is formed of any suitable material as long as the effects of the present invention can be obtained. Preferably, as described, above, the resin component 11 is formed of a compound that is of the same type as that of each of the light diffusing fine particles and that is of a different type from that of the ultrafine particle component. With this, the refractive index modulation region can be formed satisfactorily in the vicinity of the interface between the matrix and each of the light diffusing fine particles (in the vicinity of the surface of each of the light diffusing fine particles). More preferably, the resin component 11 is formed of a compound having high compatibility with each of the light diffusing fine particles, among those of the same type. With this, the refractive index modulation region having a desired gradient of the refractive index can be formed.

The resin component is formed of preferably an organic compound, more preferably an ionising radiation-curable resin. The ionizing radiation-curable resin is excellent in hardness of an applied film, and hence easily compensates for mechanical strength, which is a weak point of the ultrafine particle component described later. Examples of the ionizing radiation include UV light, visible light, infrared light, and an electron beam. Of those, UV light is preferred, and thus, the resin component is particularly preferably formed of a UV-curable resin. Examples of the UV-curable resin include resins formed of radical-polymerizable monomers and/or oligomers such as an acrylate resin (epoxy acrylate, polyester acrylate, acrylic acrylate, or ether acrylate). A monomer component (precursor) that constructs the acrylate resin preferably has a molecular weight of 200 to 700. Specific examples of the monomer component (precursor) that constructs the acrylate resin include pentaerythritol triacrylate (PETA, molecular weight: 298), neopentylglycol diacrylate (NPGDA, molecular weight: 212), dipentaerythritol hexaacrylate (DPHA, molecular weight: 632), dipentaerythritol pentaacrylate (DPPA, molecular weight: 578), and trimethylolpropane triacrylate (TMPTA, molecular weight: 296). If required, an initiator may be added to the precursor. Examples of the initiator include a UV radial generator (e.g., Irgacure 907, 127, or 192 manufactured by BASF Japan Ltd.) and benzoyl peroxide. The resin component may contain another resin component other than the ionizing radiation-curable resin. The another resin component may be an ionizing radiation-curable resin, a thermosetting resin, or a thermoplastic resin. Typical examples of the another resin component include an aliphatic (for example, polyolefin) resin and a urethane-based resin. In the case of using the another resin component, the kind and blending amount thereof are adjusted so that the refractive index modulation region is formed satisfactorily.

The resin component typically satisfies the following expression (3):

$$|n_P - n_A| < |n_P - n_B| \quad (3)$$

in the formula (3), $n_A$ represents a refractive index of a resin component of a matrix, $n_B$ represents a refractive index of an ultrafine particle component of the matrix, and $n_P$ represents a refractive index of a light diffusing fine particle. Further, the resin component may also satisfy the following expression (4), $$|n_P - n_A| < |n_A - n_B| \quad (4)$$

The refractive index of the resin component is preferably 1.40 to 1.60.

The blending amount of the resin component is preferably 10 parts by weight to 80 parts by weight, more preferably 20 parts by weight to 65 parts by weight.

A-2-2. Ultrafine Particle Component

As described above, the ultrafine particle component 12 is formed of preferably a compound of a different type from those of the resin component described above and the light diffusing fine particles described later, more preferably an inorganic compound. Preferred examples of the inorganic compound include a metal oxide and a metal fluoride. Specific examples of the metal oxide include zirconium oxide (zirconia) (refractive index: 2.19), aluminum oxide (refractive index: 1.56 to 2.62), titanium, oxide (refractive index: 2.49 to 2.74), and silicon oxide (refractive index: 1.25 to 1.46). Specific example of the metal fluoride include magnesium fluoride (refractive index: 1.37) and calcium fluoride (refractive index: 1.40 to 1.43). These metal oxides and metal fluorides absorb less light and each have a refractive index which is difficult to be expressed with organic compounds such as the ionizing radiation-curable resin and the thermoplastic resin. Therefore, the weight concentration of the ultrafine particle component becomes relatively higher with increasing distance from the interface with each of the light diffusing fine particles, and thus, the metal oxides and metal fluorides can change the refractive index largely. By setting a refractive index difference between each of the light diffusing fine particles and the matrix to be large, strong light diffusibility can be realised even with a thin film, and the effect of preventing backscattering is large because the refractive index modulation region is formed. Zirconium oxide is a particularly preferred inorganic compound.

The ultrafine particle component may also satisfy the expressions (3) and (4). The refractive index of the ultrafine particle component is preferably 1.40 or less or 1.60 or more, more preferably 1.40 or less or 1.70 to 2.80, particularly preferably 1.40 or less or 2.00 to 2.80. When the refractive index is more than 1.40 or less than 1.60, the refractive index difference between each of the light diffusing fine particles and the matrix becomes insufficient, end in the case where the light diffusing film is used in a liquid crystal display device adopting a collimated backlight front diffusing system, light from a collimated backlight cannot be diffused enough, which may narrow a viewing angle.

It is preferred that an average primary particle diameter of the ultrafine particle component be small relative to the average thickness L of the refractive index modulation region. More specifically, the average primary particle diameter is preferably 1/50 to 1/2, more preferably 1/25 to 1/3 with respect to the average thickness L. When the average primary particle diameter is more than 1/2 with respect to the average thickness L, the refractive index in the refractive index modulation region does not change substantially continuously in some cases. When the average primary particle diameter is less than 1/50, it may be difficult to form the refractive index modulation region in some cases. The average primary particle diameter is preferably 1 nm to 100 nm, more preferably 1 nm to 50 nm. The ultrafine particle component may form a secondary aggregate, and the average particle diameter (average particle diameter of the aggregate) in that case is preferably 10 nm to 100 nm, more preferably 10 nm to 80 nm. As described above, by using the ultrafine particle component with an average particle diameter smaller than the wavelength of light, geometric reflection, refraction, and scattering are not caused between the ultrafine particle component and the resin component, and a matrix that is optically uniform can be obtained. As a result, a light diffusing film that is optically uniform can be obtained.

It is preferred that the ultrafine particle component have satisfactory dispersibility with the resin component. The term "satisfactory dispersibility" as used herein means that an applied film, which is obtained by applying an application liquid obtained by mixing the resin component, the ultrafine particle component (if required, a small amount of a UV initiator), and a volatile solvent, followed by removing the solvent by drying, is transparent.

Preferably, the ultrafine particle component is subjected to surface modification. By conducting surface modification, the ultrafine particle component can be dispersed satisfactorily in the resin component, and the refractive index modulation region can be formed satisfactorily. As surface modification means, any suitable means can be adopted as long as the effect of the present invention is obtained. Typically, the surface modification is conducted by applying a surface modifier onto the surface of an ultrafine particle component to form a surface modifier layer. Preferred specific examples of the surface modifier include coupling agents such as a silane-based coupling agent and a titanate-based coupling agent, and a surfactant such as a fatty acid-based surfactant. By using such surface modifier, the wettability between the resin component and the ultrafine particle component is enhanced, the interface between the resin component and the ultrafine particle component is stabilized, the ultrafine particle component is dispersed satisfactorily in the resin component, and the refractive index modulation region can be formed satisfactorily.

The blending amount of the ultrafine particle component is preferably 15 parts by weight to 80 parts by weight, more preferably 20 parts by weight to 70 parts by weight with respect to 100 parts by weight of the matrix.

A-3. Light Diffusing Fine Particles

The light diffusing fine particles 20 are also formed of any suitable material, as long as the fine uneven-shaped boundary as described above (and consequently, the refractive index modulation region) is formed satisfactorily. Preferably, as described above, the light diffusing fine particles 20 are formed of a compound of the same type as that of the resin component of the matrix. For example, in the case where the ionizing radiation-curable resin that constructs the resin component of the matrix is an acrylate-based resin, it is preferred that the light diffusing fine particles be also constructed of the acrylate-based resin. More specifically, when the monomer component of the acrylate-based resin that constructs the resin component of the matrix is, for example, PETA, NPGDA, DPHA, DPPA, and/or TMPTA as described above, the acrylate-based resin that constructs the light-diffusing fine particles is preferably polymethyl methacrylate (PMMA), polymethyl acrylate (PMA), or a copolymer thereof, or a cross-linked product thereof. A copolymerizable component for each of PMMA and PMA is, for example, polyurethane, polystyrene (PS), or a melamine resin. Particularly preferably, the light diffusing fine particles are constructed of PMMA. This is because the relationship in refractive index and thermodynatic properties with respect to the resin component of the matrix and the ultrafine particle component is suitable. Further, preferably, the light diffusing fine particles have a cross-linked structure (three-dimensional network structure). By adjusting coarseness and fineness (cross-linking degree) of the cross-linked structure, a degree of freedom of polymer molecules forming the light diffusing fine particles on the surfaces thereof can be controlled, and hence, the dispersion state of the ultrafine particle component can be controlled, with a result that a refractive index modulation region having a desired refractive index gradient can be formed. For example, the swelling degree of each of the light diffusing fine particles at the time of the application of an application liquid described later with respect to the resin component precursor (which may contain a solvent) is preferably 100% to 200%. Here, the term "swelling degree" is an index of the cross-linking degree and refers to a ratio of an average particle diameter of each of the particles in a swollen state with respect to the average particle diameter of each of the particles before being swollen.

The average particle diameter of each of the light diffusing fine particles is preferably 1.0 µm to 5.0 µm, more preferably 1.0 µm to 4.0 µm. The average particle diameter of each of the light diffusing fine particles is preferably ½ or less (for example, ½ to 1/20) of the thickness of the light diffusing film. As long as the light diffusing fine particles each have an average particle diameter having such ratio with respect to the thickness of the light diffusing film, a plurality of light diffusing fine particles can be arranged in a thickness direction of the light diffusing film. Therefore, while incident light is passing through the light diffusing film, the incident light can be diffused in a multiple manner, and consequently, sufficient light diffusibility can be obtained.

The standard deviation of a weight average particle diameter distribution of the light diffusing fine particles is preferably 1.0 µm or less, more preferably 0.5 µm or less. When the light diffusing fine particles each having a small particle diameter with respect to the weight average particle diameter are present in a large number, the light diffusibility may increase too much to suppress backscattering satisfactorily. When the light diffusing fine particles each having a large particle diameter with respect to the weight average particle diameter are present in a large number, a plurality of the light diffusing fine particles cannot be arranged in a thickness direction of the light diffusing film, and multiple diffusion may not be obtained. As a result, the light diffusibility may become insufficient.

As the shape of each of the light diffusing fine particles, any suitable shape can be adopted depending upon the purpose. Specific examples thereof include a spherical shape, a scale-like shape, a plate shape, an oval shape, and an amorphous shape. In most cases, spherical fine particles can be used as the light diffusing fine particles.

The light diffusing fine particles may also satisfy the expressions (3) and (4). The refractive index of the light diffusing fine particles is preferably 1.30 to 1.70, more preferably 1.40 to 1.60.

The blending amount of the light diffusing fine particles is preferably 10 parts by weight to 100 parts by weight, more preferably 10 parts by weight to 40 parts by weight, still more preferably 10 parts by weight to 35 parts by weight with respect to 100 parts by weight of the matrix. For example, by allowing the light diffusing fine particles having an average particle diameter in the above-mentioned preferred range to be contained in such blending amount, a light diffusing film which has very excellent light diffusibility can be obtained.

A-4. Manufacturing Method for Light Diffusing Film

A manufacturing method for a light diffusing film according to this embodiment includes the steps of: applying an application liquid, in which a resin component or a precursor thereof and an ultrafine particle component of a matrix, and light diffusing fine particles are dissolved or dispersed in a volatile solvent, onto a base material (defined as Step A); and drying the application liquid applied onto the base material (defined as Step B).

(Step A)

The resin component or precursor thereof, the ultrafine particle component, and the light diffusing fine particles are as described in the sections A-2-1, A-2-2, and A-3, respectively. Typically, the application liquid is a dispersion in which the ultrafine particle component and the light, diffusing fine particles are dispersed in the precursor and the volatile solvent. As means for dispersing the ultrafine particle component and the light diffusing fine particles, any suitable means (for example, ultrasound treatment or dispersion treatment with a stirrer) can be adopted.

Any suitable solvent can be adopted, as the volatile solvent as long as the solvent can dissolve or uniformly disperse each component described above. Specific examples of the volatile solvent include ethyl acetate, butyl acetate, isopropyl acetate, 2-butanone (methyl ethyl ketone), methyl isobutyl ketone, cyclopentanone, toluene, isopropyl alcohol, n-butanol, cyclopentane, and water.

The application liquid can further contain any suitable additive depending upon the purpose. For example, in order to disperse the ultrafine particle component satisfactorily, a dispersant can be preferably used. Other specific examples of the additive include a UV absorbing agent, a leveling agent, and an antifoaming agent.

The blending amount of each component in the application liquid is as described in the above sections A-2 to A-3. The solid content of the application liquid can be adjusted so as to be preferably about 10% by weight to 70% by weight. With such solid content, an application liquid having a viscosity that facilitates application can be obtained.

Any suitable film can adopted as the base material as long as the effects of the present invention can be provided. Specific examples thereof include a triacetyl cellulose (TAC) film, a polyethylene terephthalate (PET) film, a polypropylene (PP) film, a nylon film, an acrylic film, and a lactone-modified acrylic film. The base material may be subjected to surface modification such as adhesion enhancement treatment, or may include an additive such as a lubricant, an antistat, or a UV absorbing agent, as required. The base material may function as a protective layer in a polarizing plate with a light diffusing film described later.

Any suitable method using a coater can be adopted as a method of applying the application liquid onto the base material. Specific examples of the coater include a bar coater, a reverse coater, a kiss coater, a gravure coater, a die coater, and a comma coater.

(Step B)

As the method of drying the application liquid, any suitable method can be adopted. Specific examples thereof include natural drying, drying by heating, and drying under reduced pressure. Drying by heating is preferred. The heating temperature is, for example, 60° C. to 150° C., and the heating time is, for example, 30 seconds to 5 minutes.

(Step C)

The manufacturing method further includes preferably the step of polymerizing the precursor after the application step (Step C). As the polymerisation method, any suitable method can be adopted depending upon the kind of the resin component (thus, the precursor thereof). For example, in the case where the resin component is an ionising radiation-curable resin, the precursor is polymerised by emitting ionizing radiation. In the case of using UV light as the ionizing radiation, the integrated light quantity is preferably 50 mJ/cm$^2$ to 1,000 mJ/cm$^2$. The transmittance of the ionising radiation with respect to the light diffusing fine particles is preferably 70% or more, more preferably 80% or more. Further, for example, in the case where the resin component is a thermosetting resin, the precursor is polymerized by heating. The heating temperature and the heating time can be set appropriately depending upon the kind of the resin component. Preferably, the polymerization is conducted by emitting ionizing radiation. The ionizing radiation can cure an applied film while keeping the refractive index modulation region satisfactorily, and hence, a light diffusing film with satisfactory diffusion property can be manufactured. By polymerizing the precursor, the matrix 10 having the refractive index modulation region 30 and the refractive index constant region is formed.

The polymerisation step (Step C) may be conducted before the drying step (Step B) or after Step B.

As described above, the light diffusing film as illustrated in FIGS. 1A and 1B is formed on a base material.

It should be appreciated that the manufacturing method for a light diffusing film according to this embodiment can include, in addition to Steps A to C, any suitable steps, treatments and/or operations at any suitable times. The kind of such steps and the like and the time when such steps and the like are conducted can be set appropriately depending upon the purpose.

As described above, the light diffusing film as described in the sections A-1 to A-3 is formed on a base material.

A-5. Another Embodiment

Figure 7:
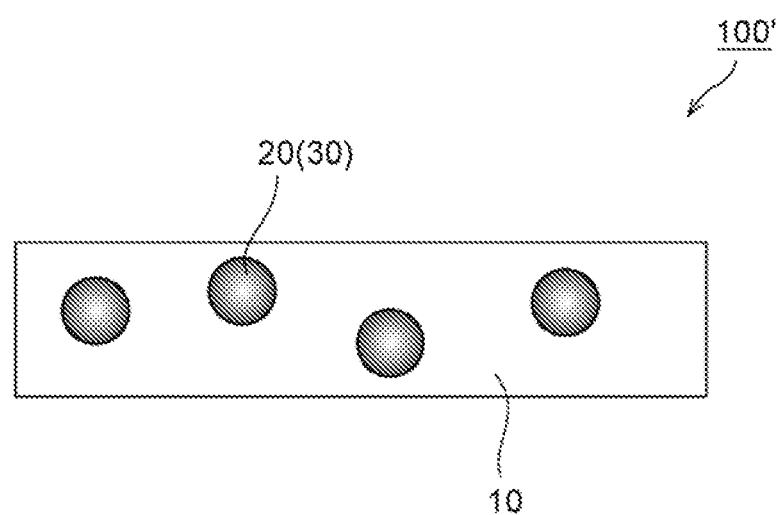
FIG. 7 is a schematic sectional view of a light diffusing film according to another embodiment of the present invention.

FIG. 7 is a schematic cross-sectional view of a light diffusing film according to another embodiment of the present invention. A light diffusing film 100' of FIG. 7 includes a matrix 10 and light diffusing fine particles 20 dispersed in the matrix 10. The light diffusing fine particles 20 are refractive index gradient particles (for example, GRIN fine particles) the refractive index of which changes from a center portion to an outside, and each refractive index gradient portion forms a refractive index modulation region 30. Typically, the refractive index gradient particles are polymer particles, each being formed of a center portion and a surface layer portion covering the center portion. A polymer forming such polymer particles is specifically, for example, a vinyl-based polymer, a (meth)acrylic polymer, or a styrene-based polymer. By selecting a polymer appropriately, a refractive index gradient can be controlled. The refractive index of each of such polymer particles can be changed in stages or continuously by, for example, using a plurality of monomers with different refractive indices, and changing monomer amounts along with the progression of copolymerization of the monomers. Such polymer particles and a manufacturing method therefor are described in detail, for example, in JP 2006-227279 A, and its description is incorporated herein by reference. For example, the matrix 10 can be formed of a resin as described in the section A-2-1 regarding a resin component in an embodiment using the ultrafine particle component. The matrix 10 may or may not contain an ultrafine particle component. In this embodiment, the center portion of the light diffusing fine particle 20 forms the first region, and the matrix 10 forms the second region. In the refractive index modulation region 30, preferably, the refractive index changes substantially continuously.

This embodiment has been described briefly only with respect to a characteristic portion of its structure. The entire characteristics of the light diffusing film according to this embodiment are as described above regarding the embodiment using a matrix including a resin component and an ultrafine particle component.

The light diffusing film according to an embodiment of the present invention may be peeled from a base material to be used as a single member or may be used as a light diffusing film with a base material. Alternatively, the light diffusing film may be used as a composite member (for example, a polarizing plate with a light diffusing film) by transferring the light diffusing film from a base material to a polarizing plate or the like, or may be used as a composite member (for example, a polarizing plate with a light diffusing film) by attaching the light diffusing film to a polarizing plate or the like together with a base material. In the case of using the light diffusing film as a composite member (for example, a polarizing plate with a light diffusing film) by attaching the light diffusing film to a polarizing plate or the like together with a base material, the base material can function as a protective layer of the polarizing plate.

The particular embodiments of the present invention have been described hereinbefore. It should be noted that the present invention is not limited to those embodiments, and the present invention includes any other light diffusing film including: a first region having a first refractive index; a substantially spherical shell-shaped refractive index modulation region surrounding the first region; and a second region having a second refractive index, the region being positioned on a side of the refractive index modulation region opposite to the first region, in which the light diffusing film satisfies the above-mentioned expressions (1) and (2), and the above-mentioned light diffusion half-value angle and thickness.

Figure 8:
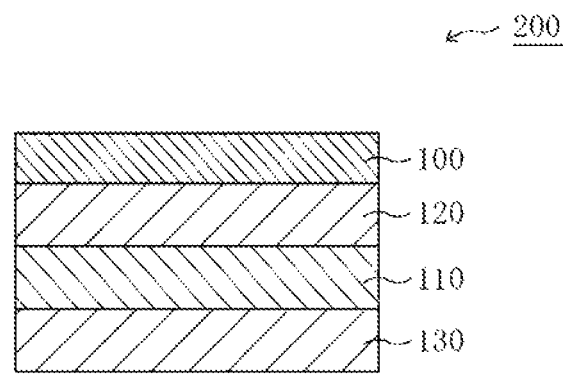
FIG. 8 is a schematic cross-sectional view of a polarizing plate with a light diffusing film according to a preferred embodiment of the present invention.

B. Polarizing Plate with Light Diffusing Film B-1. Entire Construction of Polarizing Plate with Light Diffusing Film FIG. 8 is a schematic cross-sectional view of a polarizing plate with a light diffusing film according to a preferred embodiment of the present invention. A polarizing plate with a light diffusing film 200 in the figure includes a light diffusing film 100 and a polarizer 110. The light diffusing film 100 is the light diffusing film of the present invention described in the sections A-1 to A-5. In the example illustrated in the figure, the polarizing plate with a light diffusing film 200 includes protective layers 120 and 130 on both sides of the polarizer. The light diffusing film, the polarizer and the protective layers are attached to each other via any suitable adhesive layer or pressure-sensitive adhesive layer. At least one of the protective layers 120 and 130 may be omitted depending upon the purpose, the construction of the polarizing plate, and the construction of the liquid crystal display device. For example, in the case where a base material used for forming the light diffusing film can function as a protective layer, the protective layer 120 may be omitted.

In one embodiment, a polarizing plate with a light diffusing film of the present invention is used as a viewer side polarizing plate of a liquid crystal display device adopting a collimated backlight front diffusing system. In this case, the light diffusing film 100 is disposed so as to be placed at a position closest to a viewer side when the polarizing plate with a light diffusing film is placed on the viewer side of the liquid crystal display device. Further, a low reflective layer or a reflection preventing treatment layer (anti-reflection treatment layer) may be placed on the viewer side of the light diffusing film 100 (not shown).

In another embodiment which is not shown in the drawings, a polarizing plate with a light diffusing film of the present invention is used as a backlight side polarizing plate of a liquid crystal display device, so as to effectively use light from backlight source or to eliminate a lamp image. In this case, the polarizing plate with a light diffusing film, typically includes a polarizer, a brightness enhancement film and the light diffusing film in this order from a liquid crystal cell side. The polarizing plate with a light diffusing film may include a protective layer on at least one side of the polarizer, if necessary.

B-2. Polarizer

Any appropriate polarizer can be adopted as the polarizer depending on purposes. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified, ethylene/vinyl acetate copolymer-based film and untaxially stretching the film; and a polyene-based aligned film such as a dehydrated, polyvinyl alcohol film or a dehydrochlorinated polyvinyl chloride film. Of those, a polarizer prepared by adsorbing a dichromatic substance such as iodine on a polyvinyl alcohol-based film and uniaxially stretching the film is particularly preferred because of high polarized dichromaticity. The thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like if necessary, or the polyvinyl alcohol-based film may be immersed in an aqueous solution of potassium iodide or the like. Further, the polyvinyl alcohol-based film may be immersed and washed in water before coloring if necessary.

Washing the polyvinyl alcohol-based firm with water not only allows removal of contamination on the surface of the polyvinyl alcohol-based film or washing away of an anti-blocking agent, but also provides an effect of preventing unevenness such as uneven coloring by swelling the polyvinyl alcohol-based film. The stretching of the film may be performed after coloring of the film with iodine, performed during coloring of the film, or performed followed by coloring of the film with iodine. The stretching may be performed in an aqueous solution of boric acid, potassium iodide, or the like, or in a water bath.

B-3. Protective Layer

The protective layer is formed of any appropriate film which can be used as a protective layer for a polarizing plate. As a material used as a main component of the film, there are specifically exemplified a cellulose-based resin such as triacetyl cellulose (TAC), and transparent resins such as a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth) acrylic resin, and an acetate-based resin. Further, there are exemplified a (meth)acrylic, urethane-based, (meth)acrylic urethane-based, epoxy-based, or silicone-based thermosetting resin or UV-curable resin. Still further, there are exemplified a glassy polymer such as a siloxane-based polymer. In addition, a polymer film described in JP 2001-3435.29 A (WO 01/37007) may also be used. As the film material, for example, there may be used a resin composition containing a thermoplastic resin having a substituted or unsubstituted imide group on a side chain, and a thermoplastic resin having a substituted or unsubstituted phenyl group and a nitrile group on a side chain. An example thereof is a resin composition containing an alternate copolymer of isobutene and N-methylmaleimide, and an acrylonitrile/styrene copolymer. The polymer film may be an extruded product of the resin composition, for example.

The internal protective layer (a protective layer placed on the liquid crystal cell side: the protective layer 130 in the figure) preferably has optical, isotropy. Specifically, a thickness direction retardation Rth(550) of the internal protective layer is preferably in a range of −20 nm to +20 nm, more preferably in a range of −10 nm to +10 nm, particularly preferably in a range of −6 nm to +6 nm, most preferably in a range of −3 nm to +3 nm. An in-plane retardation Re(550) of the internal protective layer is preferably 0 nm or more and 10 nm or less, more preferably 0 nm or more and 6 nm or less, particularly preferably 0 nm or more and 3 nm or less. The film for forming the protective layer having the optical isotropy is described in detail in JP 2008-180961 A and the description is incorporated herein, by reference.

B-4. Manufacturing Method for Polarizing Plate with Light Diffusing Film

Figure 9:
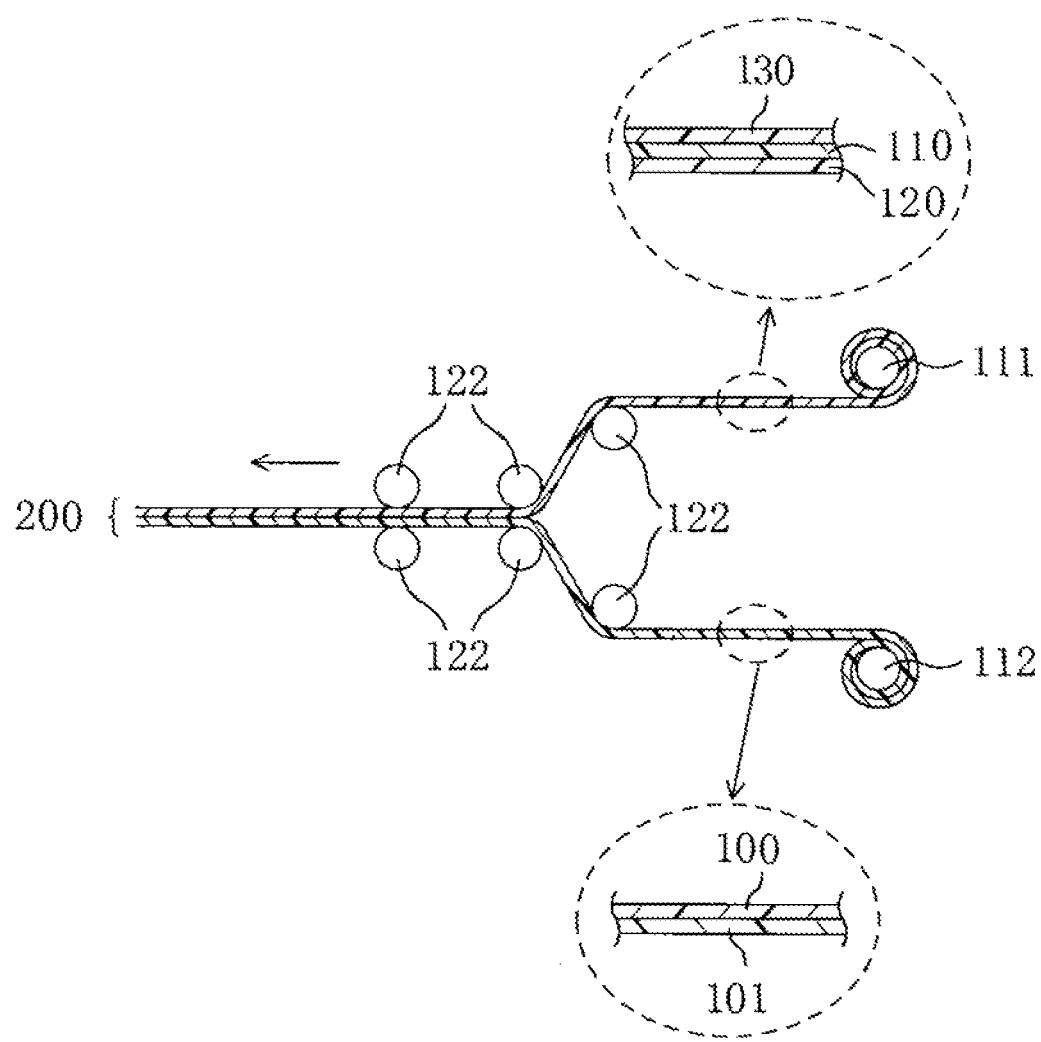
FIG. 9 is a schematic view illustrating an example of a method of producing a polarizing plate with a light diffusing film of the present invention.

Referring to FIG. 9, an example of a manufacturing method for a polarizing plate with a light diffusing film of the present invention is described briefly. In FIG. 9, reference symbols 111 and 112 respectively denote rolls for winding a polarizing plate and a laminate of a light diffusing film/a base material, and 122 denotes conveyance rolls. In the illustrated example, a polarizing plate (protective layer 130/polarizer 110/protective layer 120) and a laminate of a light diffusing film 100/a base material 101 are fed out in an arrow direction and attached to each other while their respective longitudinal directions are aligned. At this time, the polarizing plate and the laminate are attached to each other so that the light diffusing film 100 and the protective layer 120 of the polarizing plate are adjacent to each other. After that, the base material 101 is peeled off if necessary, and thereby, a polarizing plate with a light diffusing film 200 as illustrated in FIG. 8 can be obtained. Although not shown, for example, the polarizing plate (protective layer 130/polarizer 110) and the laminate of the light diffusing film 100/base material 101 can be attached to each other so that the base material 101 and the polarizer 110 are adjacent to each other to produce a polarizing plate with a light diffusing film in which the base material functions as a protective layer. Thus, according to an embodiment of the present invention, so-called roll-to-roll can be adopted, and hence, a polarizing plate with a light diffusing film can be produced at very high production efficiency. Further, the roll-to-roll process can be performed continuously from the production process of the light diffusing film described in the section A-4, and hence, the production efficiency of the polarizing plate with a light diffusing film can be further enhanced by adopting such procedure.

C. Liquid Crystal Display Device

A liquid crystal display device according to an embodiment of the present invention includes a liquid crystal cell, polarizing plates placed on both sides of the liquid crystal cell, a backlight unit provided on an outer side of one of the polarizing plates, and the light diffusing film of the present invention described in each of the section A1 to the section A-5. Any suitable optical compensation plate (retardation plate) can be placed between the liquid crystal cell and at least one of the polarizing plates depending upon the purpose. The liquid crystal cell includes a pair of substrates (typically, glass substrates), and a liquid crystal layer containing a liquid crystal as a display medium, placed between the substrates. The light diffusing film may be placed on a side closer to a viewer than a viewer side polarizing plate, or may be placed on a side closer to a backlight than a backlight side polarizing plate depending on purposes. When the light diffusing film is placed on the side closer to the viewer than the viewer side polarizing plate, the backlight unit is typically a collimated light source device for outputting collimated light toward the liquid crystal cell. It should be noted that detailed description of the entire construction of the liquid crystal display device is omitted because a construction well known in the art can be adopted.

D. Lighting Device

A lighting device of the present invention includes a light source and the light diffusing film of the present invention described in each of the section A-1 to the section A-5, the film being placed on a side to be irradiated with light from the light source. Any appropriate construction can be adopted for the lighting device of the present invention depending on purposes. For example, the light source may be an LED array, an organic EL element, or a cold cathode fluorescent tube.

EXAMPLES

Hereinafter, the present invention is specifically described by way of examples. However, the present invention is not limited by these examples. Evaluation methods in the examples are as follows. In addition, unless otherwise stated, "part(s)" and "%" in the examples are by weight.

(1) Thickness of Light Diffusing Film

The total thickness of a base material and a light diffusing film was measured with a microgauge-type thickness meter (manufactured by Mitutoyo Corporation), and the thickness of the base material was subtracted from the total thickness to calculate the thickness of the light diffusing film.

(2) Haze

Measurement was performed with a base meter ("HN-150" (trade name) manufactured by Murakami Color Research Laboratory Co., Ltd.) in accordance with a method specified in JIS 7136.

(3) Backscattering Ratio

The laminate of the light diffusing film and the base material obtained in each of the examples and comparative examples was attached onto a black acrylic plate ("SUMIPEX" (trade name) (trademark), thickness: 2 mm, manufactured by Sumitomo Chemical Co., Ltd.) via a transparent pressure-sensitive adhesive to obtain a measurement sample. The integrated reflectance of the measurement sample was measured with a spectrophotometer ("U4100" (tradename) manufactured by Hitachi Ltd.). On the other hand, a laminate of a base material and a transparent applied layer was produced as a control sample, using an application liquid in which fine particles were removed from an application liquid for the light diffusing film and the integrated reflectance (i.e., surface reflectance) thereof was measured in the same way as described above. The integrated reflectance (surface reflectance) of the control sample was subtracted from the integrated reflectance of the measurement sample to calculate a backscattering ratio of the light diffusing film.

(4) Refractive Index Modulation Region and its Thickness

A laminate of a light diffusing film and abase material obtained in each of examples and comparative examples was sliced into a piece having a thickness of 0.1 µm with a microtome while being cooled with liquid nitrogen, and the piece was used as a measurement sample. The state of a light diffusing fine particle of the light diffusing film portion of the measurement sample, and the state of an interface between the light diffusing fine particle and a matrix were observed with a transmission electron microscope (TEM). A portion where the interface between the light diffusing fine particle and the matrix was unclear was recognized as a refractive index modulation region, and then its average thickness L was calculated from a TEM image with an image analysis software. When the interface between the light diffusing fine particle and the matrix was clear, it was recognized that no refractive index modulation region was formed, and the thickness was defined as zero.

Further, a three-dimensional image was reconstructed for examining the dispersed state of ultrafine particle component in the refractive index modulation region. Specifically, gold particles each having a diameter of 5 nm were caused to adhere as markers for photographing position adjustment to the measurement sample obtained in the foregoing, and then continuous inclined TEM images (121 images) were photographed over the range of −60° to 60° in an increment of 1°. The 121 TEM images were subjected to position adjustment by a fiducial marker method to reconstruct the three-dimensional image. An IMOD 3.9.3.1 was used as a reconstruction software and an Amira available from Mercury Computer Systems was used as a display software.

(5) Light Diffusion Half-Value Angle

Figure 10:
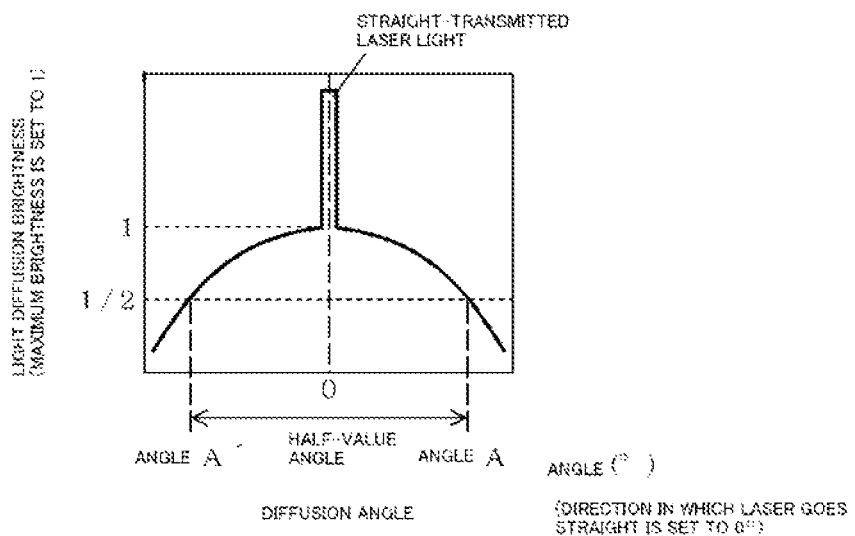
FIG. 10 is a schematic view for illustrating a method of calculating a light diffusion half-value angle.

The light diffusing film was irradiated with laser light from its front surface. The diffusion brightness of diffused light at a diffusion angle was measured every 1° by a goniophotometer. As shown in FIG. 10, diffusion angles corresponding to a half of a maximum value of diffusion brightness of light beams other than a straight-transmitted laser beam were measured on both sides of a diffusion profile. A value obtained by adding the angles measured on both sides ("(angle A)+(angle A')" in FIG. 10) was defined as a light diffusion half-value angle.

(6) Standard Deviation of In-Plane Brightnesses

A laminate (glass plate/polarizing plate/glass plate/base material/light diffusing film/polarizing plate/glass plate) of a light diffusing film with a base material obtained in each of the examples and comparative examples, polarizing plates, and glass plates (thickness: 0.7 mm) was formed with a transparent pressure-sensitive adhesive. At this time, the two polarizing plates were laminated in a crossed Nichol state. White light was transmitted through the laminate with a high-brightness white LED backlight. The image of the surface from which the transmitted light was output was photographed with a brightness-measuring camera ("PROMETRIC 1600" (trade name) manufactured by CYBERNET SYSTEMS CO., LTD.), and then in-plane brightnesses were turned into numerical data.

Of the obtained in-plane brightness values, that of a luminescent point portion was excluded. After that, the standard deviation σ of the brightnesses was calculated by correcting waviness having a cycle larger than the cycle of external appearance unevenness.

Example 1

Production of Light Diffusing Film

Figure 11:
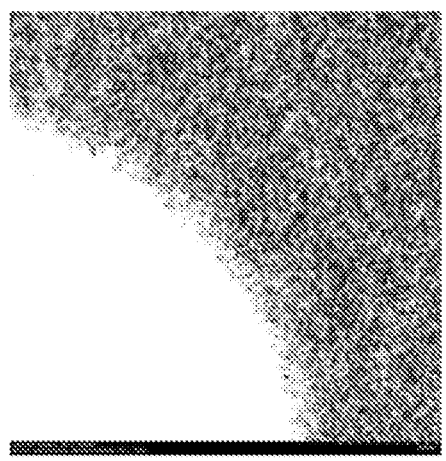
FIG. 11 is a TEM image of the vicinity of a light diffusing fine particle of a light diffusing film of Example 1.

To 100 parts of a hard coat resin ("Opstar KZ6661" (trade name) (containing MEK/MIBK), manufactured by JSR Corporation) containing 62% of zirconia nano particles (average primary particle diameter: 10 nm, average particle diameter: 60 nm, refractive index: 2.19) as an ultrafine particle component, 11 parts of a 50% methyl ethyl ketone (MEK) solution of pentaerythritol triacrylate ("Biscoat #300" (trade name), refractive index: 1.52, manufactured by Osaka Organic Chemical Industry Ltd.) as a precursor of a resin component, 0.5 part of a photopolymerization initiator ("Irgacure 907" (trade name), manufactured by BASF Japan Ltd.), 0.5 part of a leveling agent ("RS721" (trade name), manufactured by DIC Corporation), and 15 parts of polymethyl methacrylate (PMMA) fine particles ("XX-131AA" (trade name), average particle diameter: 2.5 μm, refractive index: 1.49, manufactured by Sekisui Plastics Co., Ltd.) as light diffusing fine particles were added. The mixture was subjected to dispersion treatment by mixing with a mixer ("DESPA" (trade name), manufactured by ASADA IRON WORKS. CO., LTD.) for 30 minutes to prepare an application liquid in which the above-mentioned respective components were dispersed uniformly. The solid content of the application liquid was 55%. The application liquid was applied onto a base material made of a TAC film ("FUJITAC" (tradename), thickness: 40 μm, manufactured by Fuji Photo Film Co., Ltd.) with a bar coater, dried at 100° C. for 1 minute, and irradiated with UV light with an integrated light quantity of 300 mJ to obtain a light diffusing film with a thickness of 8.1 μm. A difference between an average refractive index $n_M$ of the matrix and a refractive index m of the light diffusing fine particle in the light diffusing film thus obtained was 0.012 ($n_M$>$n_P$). The obtained light diffusing film was subjected to the above-mentioned evaluations (1) to (6). Table 1 shows the results together with the results of Examples 2 to 15 and Comparative Examples 1 to 6 described later. A relationship between a light diffusion half-value angle and a back-scattering ratio satisfied the expressions (1) and (2). Further, the obtained light diffusing film was observed with a TEM. FIG. 11 shows the result. Further, three-dimensional images were reconstructed from the TEM image. As a result, it was confirmed that such a fine uneven-shaped boundary (refractive index modulation region) as shown in FIG. 2B to FIG. 2E was formed. In addition, a relationship between a distance from the surface of each light diffusing fine particle and the dispersion concentration (presence ratio) of the ultrafine particle component was calculated from the TEM image. As a result, it was confirmed that the gradient of the dispersion concentration of the ultrafine particle component was formed as illustrated in FIG. 3.

TABLE 1

|  | Thickness (μm) | Δn | Refractive index modulation region | Light diffusion half-value angle (°) | Backscattering ratio (%) | Haze (%) | Standard deviation σ of in-plane brightnesses |
| --- | --- | --- | --- | --- | --- | --- | --- |
| Example 1 | 8.1 | 0.12 | Present | 40 | 0.19 | 97.92 | 0.48 |
| Example 2 | 10.2 | 0.12 | Present | 60 | 0.38 | 98.96 | 0.50 |
| Example 3 | 14.3 | 0.12 | Present | 68 | 0.48 | 99.09 | 0.51 |
| Example 4 | 15.5 | 0.12 | Present | 74 | 0.78 | 99.11 | 0.55 |
| Example 5 | 10 | 0.12 | Present | 40 | 0.23 | 97.91 | 0.42 |
| Example 6 | 12 | 0.12 | Present | 54 | 0.36 | 98.60 | 0.51 |
| Example 7 | 14 | 0.12 | Present | 60 | 0.45 | 98.96 | 0.52 |
| Example 8 | 17 | 0.12 | Present | 66 | 0.49 | 98.97 | 0.53 |
| Example 9 | 18 | 0.12 | Present | 76 | 0.83 | 99.21 | 0.60 |
| Example 10 | 10.2 | 0.12 | Present | 60 | 0.38 | 98.96 | 0.85 |
| Example 11 | 10 | 0.12 | Present | 59 | 0.29 | 98.82 |  |
| Example 12 | 10 | 0.12 | Present | 41 | 0.21 | 97.01 |  |
| Example 13 | 9 | 0.08 | Present | 30 | 0.05 | 95.93 |  |
| Example 14 | 5 | 0.12 | Present | 32 | 0.10 | 96.12 |  |
| Example 15 | 20 | 0.12 | Present | 125 | 2.40 | 99.80 |  |
| Comparative Example 1 | 11 | 0.14 | Absent | 44 | 0.51 | 98.30 | 0.48 |
| Comparative Example 2 | 13 | 0.14 | Absent | 58 | 0.69 | 98.92 | 0.50 |
| Comparative Example 3 | 15 | 0.14 | Absent | 70 | 1.02 | 99.11 | 0.52 |
| Comparative Example 4 | 10 | 0.03 | Absent | 5 | 0.004 | 21.00 | 0.38 |
| Comparative Example 5 | 10 | 0.11 | Absent | 20 | 0.01 | 93.26 |  |
| Comparative Example 6 | 10 | 0.15 | Present | 20 | 0.06 | 87.51 |  |

Example 2

Production of Light Diffusing Film

A light diffusing film having a thickness of 10.2 μm was obtained in the same manner as in Example 1 except that the application thickness of the application liquid was changed. The obtained light diffusing film was subjected to the evaluations (1) to (6). Table 1 shows the results. A relationship between a light diffusion half-value angle and a backscattering ratio satisfied the expressions (1) and (2).

Example 3

Production of Light Diffusing Film

A light diffusing film having a thickness of 14.3 μm was obtained in the same manner as in Example 1 except that the application thickness of the application liquid was changed. The obtained light diffusing film was subjected to the evaluations (1) to (6). Table 1 shows the results. A relationship between a light diffusion half-value angle and a backscattering ratio satisfied the expressions (1) and (2).

Example 4

Production of Light Diffusing Film

A light diffusing film having a thickness of 15.5 μm was obtained in the same manner as in Example 1 except that the application thickness of the application liquid was changed. The obtained light diffusing film was subjected to the evaluations (1) to (6). Table 1 shows the results. A relationship between a light diffusion half-value angle and a backscattering ratio satisfied the expressions (1) and (2).

Example 5

Production of Light Diffusing Film

A light diffusing film having a thickness of 10 μm was obtained in the same manner as in Example 1 except that the PMMA fine particles as the light diffusing fine particles were changed to fine particles available under the trade name "Art Pearl J4P" (average particle diameter: 2.1 μm, refractive index; 1.49) from Negami Chemical Industrial Co., Ltd. The obtained light diffusing film was subjected to the evaluations (1) to (6). Table 1 shows the results. A relationship between a light diffusion half-value angle and a backscattering ratio satisfied, the expressions (1) and (2).

Example 6

Production of Light Diffusing Film

A light diffusing film having a thickness of 12 μm was obtained in the same manner as in Example 5 except that the application thickness of the application liquid was changed. The obtained light diffusing film was subjected to the evaluations (1) to (6). Table 1 shows the results. A relationship between a light diffusion half-value angle and a backscattering ratio satisfied the expressions (1) and (2).

Example 7

Production of Light Diffusing Film

A light diffusing film having a thickness of 14 μm was obtained in the same manner as in Example 5 except that the application thickness of the application liquid was changed. The obtained light diffusing film was subjected to the evaluations (1) to (6). Table 1 shows the results. A relationship between, a light diffusion half-value angle and a backscattering ratio satisfied the expressions (1) and (2).

Example 8

Production of Light Diffusing Film

A light diffusing film having a thickness of 17 μm was obtained in the same manner as in Example 5 except that the application thickness of the application liquid was changed. The obtained light diffusing film was subjected to the evaluations (1) to (6). Table 1 shows the results. A relationship between a light diffusion half-value angle and a backscattering ratio satisfied the expressions (1) and (2).

Example 9

Production of Light Diffusing Film

A light diffusing film having a thickness of 18 μm was obtained in the same manner as in Example 5 except that the application thickness of the application liquid was changed. The obtained light diffusing film was subjected to the evaluations (1) to (6). Table 1 shows the results. A relationship between a light diffusion half-value angle and a backscattering ratio satisfied the expressions (1) and (2).

Example 10

Production of Light Diffusing Film

A light diffusing film having a thickness of 10.2 μm was obtained in the same manner as in Example 2 except that the leveling agent was changed to "GRANDIC PC 4100". The obtained light diffusing film was subjected to the evaluations (1) to (6). Table 1 shows the results. A relationship between a light diffusion half-value angle and a backscattering ratio satisfied the expressions (1) and (2).

Example 11

Production of Light Diffusing Film

A light diffusing film having a thickness of 10 μm was obtained in the same manner as in Example 1 except for using 15 parts of fine particles of polymethyl methacrylate (PMMA) provided with a hydrophilic group ("XX-157-AA" (trade name), average particle diameter: 2.5 μm, refractive index: 1.495, manufactured by Sekisui Plastics Co., Ltd.) as light diffusing fine particles. The obtained light diffusing film was subjected to the evaluations (1) to (6). Table 1 shows the results. A relationship between a light diffusion half-value angle and a backscattering ratio satisfied the expressions (1) and (2).

Example 12

Production of Light Diffusing Film

A light diffusing film having a thickness of 10 μm was obtained in the same manner as in Example 1 except for using 15 parts of copolymer fine particles of polymethyl methacrylate (PMMA) and polystyrene (PS) ("XX-164-AA" (trade name), average particle diameter: 2.5 μm, refractive index;

1.495, manufactured by Sekisui Plastics Co., Ltd.) as light diffusing fine particles. The obtained light diffusing film was subjected to the evaluations (1) to (6). Table 1 shows the results. A relationship between a light diffusion half-value angle and a backscattering ratio satisfied the expressions (1) and (2).

Example 13

Production of Light Diffusing Film

A light diffusing film having a thickness of 9 μm was obtained in the same manner as in Example 1 except that the content of zirconia nanoparticles as an ultrafine particle component in a hard coat resin was set to 25%. The obtained light, diffusing film was subjected to the evaluations (1) to (6). Table 1 shows the results. A relationship between a light diffusion half-value angle and a backscattering ratio satisfied the expressions (1) and (2).

Example 14

Production of Light Diffusing Film

A light diffusing film having a thickness of 5 μm was obtained in the same manner as in Example 1 except that the application thickness of the application liquid was changed. The obtained light diffusing film was subjected to the evaluations (1) to (6). Table 1 shows the results. A relationship between a light diffusion half-value angle and a backscattering ratio satisfied the expressions (1) and (2).

Example 15

Production of Light Diffusing Film

A light diffusing film having a thickness of 20 μm was obtained in the same manner as in Example 1 except that the application thickness of the application liquid was changed. The obtained light diffusing film was subjected to the evaluations (1) to (6). Table 1 shows the results. A relationship between a light diffusion half-value angle and a backscattering ratio satisfied the expressions (1) and (2).

Comparative Example 1

Figure 12:
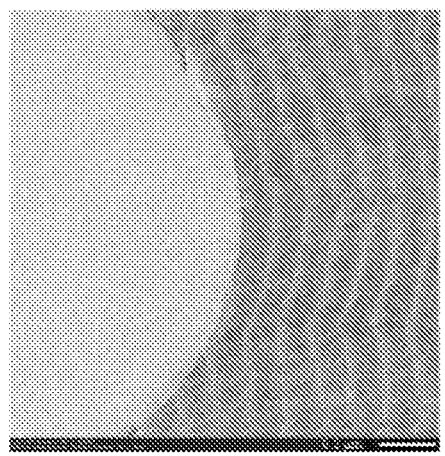
FIG. 12 is a TEM image of the vicinity of a light diffusing fine particle of a light diffusing film of Comparative Example 1.

A light diffusing film having a thickness of 11 μm was obtained in the same manner as in Example 1 except that the light diffusing fine particles were changed to silicone resin fine particles ("TOSPEARL 120" (trade name) average particle diameter: 2.0 μm, refractive index: 1.43, manufactured by Momentive Performance Materials Inc.). The obtained light diffusing film was subjected to the evaluations (1) to (6). Table 1 shows the results. A relationship between a light diffusion half-value angle and a backscattering ratio did not satisfy the expressions (1) and (2). Further, FIG. 12 shows a TEM photograph of the vicinity of one of the light diffusing fine particles. As is apparent from FIG. 12, no refractive index modulation region was formed in the light diffusing film of Comparative Example 1.

Comparative Example 2

A light diffusing film having a thickness of 13 μm was obtained in the same manner as in Comparative Example 1 except that the application thickness of the application liquid was changed. The obtained light diffusing film was subjected to the evaluations (1) to (6). Table 1 shows the results. A relationship between a light diffusion half-value angle and a backscattering ratio did not satisfy the expressions (1) and (2). In addition, as a result of observation with a TEM, it was confirmed that an interface between each light diffusing fine particle and the matrix was clear, and hence no refractive index modulation region was formed.

Comparative Example 3

A light diffusing film having a thickness of 15 μm was obtained in the same manner as in Comparative Example 1 except that the application thickness of the application liquid was changed. The obtained light diffusing film was subjected to the evaluations (1) to (6). Table 1 shows the results. A relationship between a light diffusion half-value angle and a backscattering ratio did not satisfy the expressions (1) and (2). In addition, as a result of observation with, a TEM, it was confirmed that an interface between each light diffusing fine particle and the matrix was clear, and hence no refractive index modulation region was formed.

Comparative Example 4

A light diffusing film having a thickness of 10 μm was obtained in the same manner as in Example 1 except for using a hard coat resin not containing zirconia nanoparticles as an ultrafine particle component. The obtained light diffusing film was subjected to the evaluations (1) to (6). Table 1 shows the results. A relationship between a light diffusion half-value angle and a backscattering ratio did not satisfy the expressions (1) and (2). In addition, as a result of observation with a TEM, it was confirmed that an interface between each light diffusing fine particle and the matrix was clear, and hence no refractive index modulation region was formed.

Comparative Example 5

A light diffusing film having a thickness of 10 μm was obtained in the same manner as in Example 1 except for adding 15 parts of polystyrene (PS) fine particles ("SX-350H" (trade name), average particle diameter; 3.5 μm, refractive index; 1.595, manufactured by Soken Chemical & Engineering Co., Ltd.) as light diffusing fine particles to 100 parts of a hard coat resin ("Z7540" (trade name), manufactured by JSR Corporation) containing 30% of silica nanoparticles (average primary particle diameter: 10 nm, average particle diameter: 40 nm, refractive index: 1.49) as an ultrafine particle component. The obtained light diffusing film was subjected to the evaluations (1) to (6). Table 1 shows the results. A relationship between a light diffusion half-value angle and a backscattering ratio did not satisfy the expressions (1) and (2). In addition, as a result of observation with a TEM, it was confirmed that an interface between each light diffusing fine particle and the matrix was clear, and hence no refractive index modulation region was formed.

Comparative Example 6

A light diffusing film having a thickness of 10 μm was obtained in the same manner as in Example 1 except for using 15 parts of epoxy-modified silica fine particles ("Seahoster KG-250" (trade name), manufactured by Nippon Shokubai Co., Ltd. as light diffusing fine particles. The obtained light diffusing film was subjected to the evaluations (1) to (6). Table 1 shows the results. A relationship between a light diffusion half-value angle and a backscattering ratio did not satisfy the expressions (1) and (2).

Example 16

Production of Liquid Crystal Display Device

A liquid crystal cell was removed from a commercially available liquid crystal TV ("KDL20J3000" (trade name), BRAVIA (20-inch), manufactured by Sony Corporation) having a liquid crystal cell of a multi-domain type VA mode. Commercially available polarizing plates ("NPE-SEG1423DU" (trade name), manufactured by Nitto Denko Corporation) were attached to both sides of the liquid crystal cell so that absorption axes of the respective polarizers were perpendicular to each other. More specifically, the polarizing plates were attached to the liquid crystal cell so that the absorption axis direction of the polarizer of the backlight side polarizing plate became a vertical direction (90° with respect to the longitudinal direction of the liquid crystal panel) and the absorption axis direction of the polarizer of the viewer side polarizing plate became a horizontal direction (0° with respect to the longitudinal direction of the liquid crystal panel). Further, the light diffusing film of Example 1 was transferred from the base material to be attached to the outer side of the viewer side polarizing plate to produce a liquid crystal panel.

Meanwhile, a pattern of a lenticular lens was transferred to one surface of a PMMA sheet by melt thermal transfer, using a transfer roll. Aluminum was pattern deposited to a surface (smooth surface) on a side opposite to the surface on which the lens pattern was formed so that light passed through only a focal point of the lens, and thus, a reflective layer having an area ratio of an opening of 7% (area ratio of a reflection portion of 93%) was formed. Thus, a light collecting element was produced. As a light source of a backlight, a cold cathode fluorescent lamp (CCFL of BRAVIA20J, manufactured by Sony Corporation) was used, and the light collecting element was attached, to the light source to produce a collimated light source device (backlight unit) emitting collimated light.

The above-mentioned backlight unit was incorporated into the above-mentioned liquid crystal panel to produce a liquid crystal display device of a collimated backlight front diffusing system. A white display and a black display were performed in a dark place in the obtained liquid crystal display device, and the display states were visually observed. As a result, the liquid crystal display device exhibited satisfactory display characteristics in which a black display was dark in a bright place, and brightness of a white display in a dark place was high, when seen from an oblique direction.

Comparative Example 7

A liquid crystal display device was produced in the same manner as in Example 16 except for using the light diffusing film of Comparative Example 1. A white display and a black display were performed in a dark place in the obtained liquid crystal display device, and the display states were visually observed. As a result, although brightness of a white display in a dark place was high, a black display in a bright place looked whitish when seen from an oblique direction.

Comparative Example 8

A liquid crystal display device was produced in the same manner as in Example 16 except for using the light diffusing film of Comparative Example 2. A white display and a black display were performed in a dark place in the obtained liquid crystal display device, and the display states were visually observed. As a result, although brightness of a white display in a dark place was high, a black display in a bright place looked whitish when seen from an oblique direction.

Comparative Example 9

A liquid crystal display device was produced in the same manner as in Example 16 except for using the light diffusing film of Comparative Example 3. A white display and a black display were performed in a dark place in the obtained liquid crystal display device, and the display states were visually observed. As a result, although brightness of a white display in a dark place was high, a black display in a bright, place looked whitish when seen from an oblique direction.

Example 17

Production of Backlight Side Polarizing Element

To 100 parts of a hard coat resin ("Opster KZ6661" (trade name) (containing MEK/MIBK), manufactured by JSR Corporation) containing 62% of zirconia nanoparticles (average particle diameter: 60 nm, refractive index: 2.19) as an ultrafine particle component were added 70 parts of a 50% methyl ethyl ketone (MEK) solution of pentaerythritol triacrylate ("Biscoat #300" (trade name), refractive index: 1.52, manufactured by Osaka Organic Chemical Industry Ltd.) as a precursor of a resin component, 0.5 part of a photopolymerization initiator ("Irgacure 907" (trade name), manufactured by BASF Japan ltd.), 0.1 part of a leveling agent ("MEGAFAC 479" (trade name) manufactured by DIC Corporation), and 20 parts of polymethyl methacrylate (PMMA) fine particles ("Art Pearl J4P" (trade name), average particle diameter: 2.1 μm, refractive index: 1.49, manufactured by Negami Chemical Industrial Co., Ltd.) as light diffusing fine particles, and toluene was added as a diluting solvent to the mixture so that its solid content became 50%. This mixture was subjected to treatment with a mixer so that the respective components were dispersed uniformly to prepare an application liquid.

The application liquid was applied onto a brightness enhancement film ("DBEF" (trade name), thickness: 38 μm, manufactured by Sumitomo 3M Ltd.) having a birefringent multi-layered structure through use of a die coater. The application liquid was dried in an oven, at 80° C. for 2 minutes and irradiated with UV light having an integrated light quantity of 300 mJ through use of a high-pressure mercury vapor lamp to form a light diffusing film (light diffusing layer) having a thickness of 6.5 μm on the brightness enhancement film. Next, the obtained laminate of the brightness enhancement film and the light diffusing film was attached to a commercially available polarizing plate ("NPF" (trade name), manufactured by Nitto Denko Corporation) through a pressure-sensitive adhesive to provide a polarizing element.

The obtained polarizing element was placed on a backlight in a diffusion plate/lamp house construction, and light diffusion illuminance and a lamp image were evaluated. It was confirmed that the light diffusion illuminance was as extremely high as 6,000 Lx or more and hence the light beam of the backlight was efficiently applied. Further, no lamp image was observed and hence it was confirmed that the lamp image was favorably eliminated.

<Evaluation>

Figure 13:
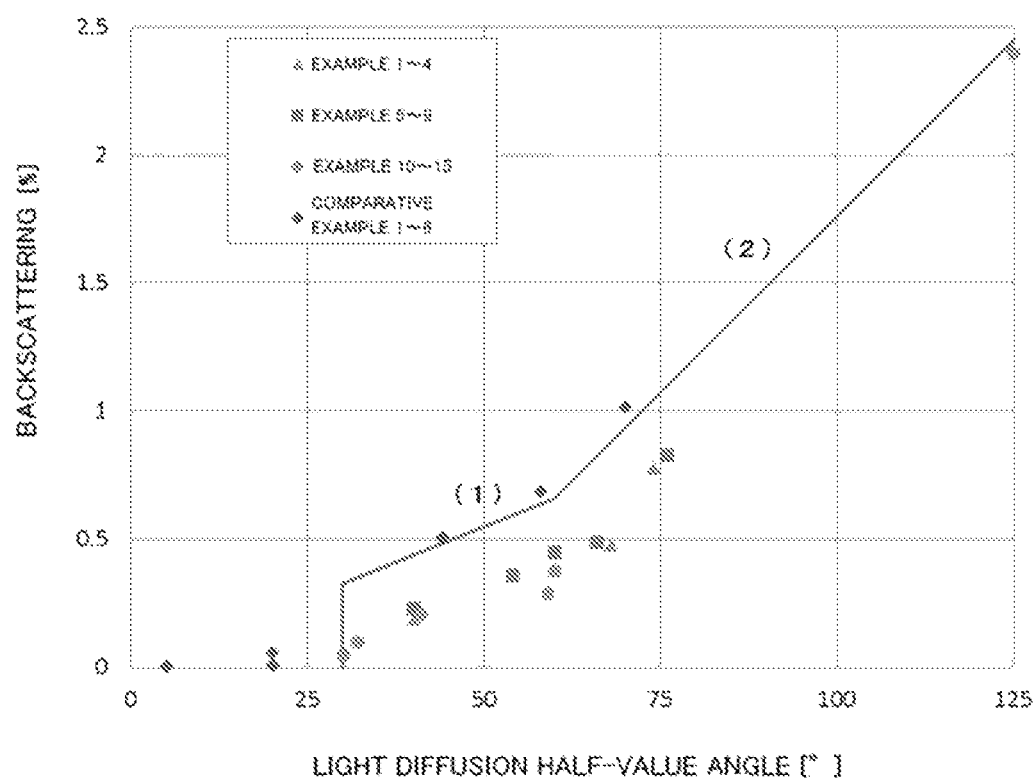
FIG. 13 is a graph illustrating a relationship between the light diffusion half-value angle and backscattering ratio of each of the light diffusing films of examples and comparative examples.

FIG. 13 illustrates the relationship between the light diffusion half-value angle and backscattering ratio of each of the light diffusing films of the examples and comparative examples. As is apparent from the examples, according to the present invention, a strongly diffusible, low-backscattering, and extremely thin light diffusing film was able to be actually produced by a simple procedure. As illustrated in FIG. 13, the light diffusing films or the examples each satisfied the expressions (1) and (2). On the other hand, none of the light diffusing films of the comparative examples could satisfy the expressions (1) and (2) because the backscattering ratio became large at the same level of light diffusion half-value angle as compared with, the light diffusing film of the present invention. The use of such light diffusing film as a front diffusing element for a liquid crystal display device of a collimated backlight front diffusion system was observed to cause a problem in that the white blurring of black display at a bright, place occurred. In addition, the light diffusing film of Comparative Example 4 having an extremely small light diffusion half-value angle could not be put into practical use because its haze was extremely insufficient, though its backscattering ratio was low.

INDUSTRIAL APPLICABILITY

The light diffusing film and the polarizing plate with a light diffusing film of the present invention can each be used suitably in a viewer side member of a liquid crystal display device, a member for a backlight of a liquid crystal display device, and a diffusing member for illumination equipment (for example, an organic EL, LED).

REFERENCE SIGNS LIST 10 matrix
11 resin component
12 ultrafine particle component
20 light diffusing fine particle
25 fine uneven-shaped boundary
30 refractive index modulation region
100, 100' light diffusing film
110 polarizer
120 protective layer
130 protective layer
200 polarizing plate with light diffusing film
500 liquid crystal display device

The invention claimed is:
1. A light diffusing film, comprising:
a first region having a first refractive index;
a substantially spherical shell-shaped refractive index modulation region surrounding the first region; and
a second region having a second refractive index, the second region is positioned on a side of the refractive index modulation region opposite to the first region,
wherein the light diffusing film has a light diffusion half-value angle of 30° or more and a thickness of 4 μm to 25 μm and satisfies the following expressions (1) and (2):

$$y \leq 0.011x (30 \leq x \leq 60) \tag{1}$$

$$y \leq 0.0275x - 0.99 (60 \leq x) \tag{2}$$

where x represents the light diffusion half-value angle(°) and y represents a backscattering ratio (%), the expressions (1) and (2) each representing a relationship between a numerical value for the light diffusion half-value angle and a numerical value for the backscattering ratio.

2. A light diffusing film according to claim 1, wherein the refractive index modulation region is formed of a fine uneven-shaped and spherical shell-shaped boundary formed by the first region and the second region.

3. A light diffusing film, comprising:
a matrix; and
light diffusing fine particles dispersed in the matrix,
wherein the light diffusing film has a light diffusion half-value angle of 30° or more and a thickness of 4 μm to 25 μm and satisfies the following expressions (1) and (2):

$$y \leq 0.011x (30 \leq x \leq 60) \tag{1}$$

$$y \leq 0.0275x - 0.99 (60 \leq x) \tag{2}$$

where x represents the light diffusion half-value angle(°) and y represents a backscattering ratio (%), the expressions (1) and (2) each representing a relationship between a numerical value for the light diffusion half-value angle and a numerical value for the backscattering ratio.

4. A light diffusing film according to claim 3, wherein a standard deviation σ of in-plane brightnesses is 0.8 or less.

5. A light diffusing film according to claim 3, wherein a refractive index modulation region in which a refractive index changes in a substantially continuous manner is formed at an interface between the matrix and each of the light diffusing fine particles or in a vicinity thereof.

6. A light diffusing film according to claim 5, wherein the matrix contains a resin component and an ultrafine particle component, and the refractive index modulation region is formed by a substantial gradient of a dispersion concentration of the ultrafine particle component in the matrix.

7. A polarizing plate with a light diffusing film, comprising:
the light diffusing film according to claim 1; and
a polarizer.

8. A liquid crystal display device, comprising:
a liquid crystal cell; and
the light diffusing film according to claim 1.

9. A lighting equipment, comprising:
a light source; and
the light diffusing film according to claim 1.

10. A light diffusing film according to claim 1, wherein a standard deviation σ of in-plane brightnesses is 0.8 or less.

11. A light diffusing film according to claim 1, wherein a refractive index modulation region in which a refractive index changes in a substantially continuous manner is formed at an interface between the matrix and each of the light diffusing fine particles or in a vicinity thereof.

12. A light diffusing film according to claim 11, wherein the matrix contains a resin component and an ultrafine particle component, and the refractive index modulation region is formed by a substantial gradient of a dispersion concentration of the ultrafine particle component in the matrix.

13. The light diffusing film according to claim 1, wherein the light diffusing film satisfies the following expressions (1b) and (2b):

$$y \geq 0.011x - 0.56 (30 \leq x \leq 60) \tag{1b}$$

$$y \geq 0.0275x - 1.55 (60 < x) \tag{2b}$$

14. The light diffusing film according to claim 3, wherein the light diffusing film satisfies the following expressions (1b) and (2b):

$$y \geq 0.011x - 0.56 (30 \leq x \leq 60) \tag{1b}$$

$$y \geq 0.0275x - 1.55 (60 < x) \tag{2b}$$

15. The light diffusing film according to claim 1, wherein the light diffusing film satisfies the following expressions (1c) and (2c):

$y \geq 0.011x - 0.46 (30 \leq x \leq 60)$  (1c)

$y \geq 0.0275x - 1.45 (60 < x)$  (2c).

16. The light diffusing film according to claim 3, wherein the light diffusing film satisfies the following expressions (1c) and (2c):

$y \geq 0.011x - 0.46 (30 \leq x \leq 60)$  (1c)

$y \geq 0.0275x - 1.45 (60 < x)$  (2c).

17. The light diffusing film according to claim 1, wherein the light diffusing film has a light diffusion half-value angle of 30° to 130°.

18. The light diffusing film according to claim 3, wherein the light diffusing film has a light diffusion half-value angle of 30° to 130°.

19. The light diffusing film according to claim 1, wherein the light diffusing film has a light diffusion half-value angle of 40° to 90°.

20. The light diffusing film according to claim 3, wherein the light diffusing film has a light diffusion half-value angle of 40° to 90°.

21. The light diffusing film according to claim 5, wherein the refractive index modulation region is a fine uneven-shaped and spherical shell-shaped boundary.

22. The light diffusing film according to claim 1, wherein the backscattering ratio of the light diffusing film is 0.02% to 0.70%.

23. The light diffusing film according to claim 3, wherein the backscattering ratio of the light diffusing film is 0.02% to 0.70%.

24. The light diffusing film according to claim 6, wherein the resin and the light diffusing fine particles are composed of the same type of material and the ultrafine particle component is composed of a different type of material.

25. The light diffusing film according to claim 24, wherein the same type of material is an organic compound and the different type of material is an inorganic compound.

26. The light diffusing film according to claim 2, wherein the fine uneven-shaped and spherical shell-shaped boundary has an average height of 10 nm to 60 nm.

27. The light diffusing film according to claim 21, wherein the fine uneven-shaped and spherical shell-shaped boundary has an average height of 10 nm to 60 nm.

28. The light diffusing film according to claim 2, wherein the fine uneven-shaped and spherical shell-shaped boundary has an average pitch of 10 nm to 50 nm.

29. The light diffusing film according to claim 21, wherein the fine uneven-shaped and spherical shell-shaped boundary has an average pitch of 10 nm to 50 nm.

30. The light diffusing film according to claim 3, wherein the refractive index of the matrix is larger than the refractive index of the light diffusing fine particles.

31. The light diffusing film according to claim 1, wherein the second refractive index is larger than the first refractive index.

32. The light diffusing film according to claim 3, wherein the matrix comprises a resin component and an ultrafine particle component.

33. The light diffusing film according to claim 1, wherein the backscattering ratio of the light diffusing film is 0.02% to 0.30%.

* * * * *